United States Patent
Tanaka et al.

(10) Patent No.: US 7,830,416 B2
(45) Date of Patent: Nov. 9, 2010

(54) IMAGING DEVICE WITH ERRONEOUS SHAKE CORRECTION PREVENTION DUE TO FRONT CURTAIN SHOCK

(75) Inventors: Yoshiharu Tanaka, Osaka (JP); Nobuharu Murashima, Nara (JP)

(73) Assignee: Sony Corporation, Tokyo (JP)

( * ) Notice: Subject to any disclaimer, the term of this patent is extended or adjusted under 35 U.S.C. 154(b) by 653 days.

(21) Appl. No.: 11/908,297

(22) PCT Filed: Jan. 10, 2007

(86) PCT No.: PCT/JP2007/050161
§ 371 (c)(1),
(2), (4) Date: Sep. 11, 2007

(87) PCT Pub. No.: WO2007/083545
PCT Pub. Date: Jul. 26, 2007

(65) Prior Publication Data
US 2009/0231450 A1 Sep. 17, 2009

(30) Foreign Application Priority Data
Jan. 20, 2006 (JP) ............................. 2006-011955

(51) Int. Cl.
*H04N 5/228* (2006.01)
(52) U.S. Cl. .................. 348/208.99; 348/208.6
(58) Field of Classification Search ........................ None
See application file for complete search history.

(56) References Cited

U.S. PATENT DOCUMENTS

| 6,343,187 | B1 * | 1/2002 | Sato ............................. 396/52 |
| 6,345,152 | B1 * | 2/2002 | Sato ............................. 396/52 |
| 6,487,369 | B1 * | 11/2002 | Sato ............................. 396/52 |
| 2006/0056839 | A1 * | 3/2006 | Abe et al. .................... 396/452 |
| 2007/0189745 | A1 * | 8/2007 | Masuda ........................ 396/55 |
| 2007/0201848 | A1 * | 8/2007 | Taguchi ....................... 396/55 |

(Continued)

FOREIGN PATENT DOCUMENTS

JP 5 199451 8/1993

(Continued)

OTHER PUBLICATIONS

U.S. Appl. No. 11/911,542, filed Oct. 15, 2007, Murashima, et al.

*Primary Examiner*—Justin P Misleh
(74) *Attorney, Agent, or Firm*—Oblon, Spivak, McClelland, Maier & Neustadt, L.L.P.

(57) ABSTRACT

In an imaging apparatus, an erroneous shake correction is prevented from being performed due to a front curtain shock. A shutter selecting section determines a current state is a shake-correction execution mode when a shake correction switch is ON, when a tripod detection sensor tripod is not mounted, when a shake detection sensor senses a shake amount equal to or larger than a predetermined value, and when a shutter speed is lower than a predetermined value. In this case, the shutter selecting section selects an electronic focal plane shutter as the front curtain, and supplies an operation command signal to an electronic focal plane shutter control section. In other cases, the shutter selecting section determines the current state is not the shake-correction execution mode, and selects a mechanical focal plane shutter as the front curtain and supplies an operation command signal to a shutter drive control section.

21 Claims, 17 Drawing Sheets

U.S. PATENT DOCUMENTS

2008/0013935 A1 * 1/2008 Uenaka ................ 396/55

FOREIGN PATENT DOCUMENTS

| JP | 7 20523 | 1/1995 |
| JP | 11 41523 | 2/1999 |
| JP | 2000 152057 | 5/2000 |
| JP | 2004 140793 | 5/2004 |
| JP | 2005 159711 | 6/2005 |
| JP | 2005 184380 | 7/2005 |

* cited by examiner

IMAGING DEVICE WITH ERRONEOUS SHAKE CORRECTION PREVENTION DUE TO FRONT CURTAIN SHOCK

TECHNICAL FIELD

The present invention relates to an imaging apparatus with shake correction function incorporating a CMOS imaging device, and more specifically to an imaging apparatus in which, depending on the situation, a front curtain can be effected by an electronic focal plane shutter and a rear curtain can be effected by a mechanical focal plane shutter.

BACKGROUND ART

As compared with an imaging device using a CCD (Charge Coupled Device), an imaging device using a CMOS (Complementary Metal Oxide Semiconductor) enables faster readout of pixel signals, less power consumption, and higher integration. Since such an imaging device can comply with requirements placed on an imaging apparatus in terms of size, performance, and the like, it has been attracting attention as an imaging device to be mounted on an imaging apparatus. Such a CMOS imaging device is also unique in enabling a so-called random scan whereby electric charge is read out by specifying an arbitrary pixel via horizontal and vertical signal lines.

With regard to an imaging apparatus incorporating such a CMOS imaging device, Japanese Unexamined Patent Application Publication No. 2000-152057 discloses a configuration in which the front curtain in a shutter operation is effected by an electronic focal planer shutter, and the rear curtain is effected by a mechanical focal plane shutter. That is, according to the disclosed imaging apparatus, reset signals for resetting respective pixels included in the imaging device are sequentially supplied on a pixel line by pixel line basis to start exposure on the imaging device (electronic focal plane shutter as the front curtain), and mechanical light shielding is effected by causing a curtain to travel after the elapse of a set exposure period (mechanical focal plane shutter as the rear curtain), thus terminating exposure of the imaging device.

Incidentally, more and more recent imaging apparatuses such as digital still cameras incorporate a camera shake correction function to suppress a deterioration in the image quality of a captured image due to camera shake. With this camera shake function, an amount of shake applied to an imaging apparatus is detected by an angular velocity sensor or the like, and a structure such as a shake correction lens or an imaging device undergoes a shake correction drive in accordance with the amount of shake. However, a problem that often occurs with this kind of imaging apparatus incorporating a camera shake correction function is that the camera shake correction performance deteriorates due to vibrations generated by the traveling curtains of the mechanical focal plane shutter. This problem occurs as follows. When the curtains travel so as to open the optical path and the opening of the optical path is completed, the curtains collide against each other within the shutter unit, generating impact vibration. This impact vibration is detected by an angular velocity sensor, so a shake amount detection signal including an erroneous signal that does not correspond to the actual amount of shake due to camera shake is outputted.

As an approach to solving this problem, Japanese Unexamined Patent Application Publication No. 7-20523 discloses mitigating the above-mentioned impact vibration by controlling the curtain speed of the mechanical focal plane shutter to be slow during long exposure for which camera shake correction is required. However, since controlling the speed of curtains requires a rather complex mechanism, this involves the problem of hindering downsizing of the imaging apparatus and driving up cost. Although other conceivable methods include arranging the angular velocity sensor at a position where it is subjected to as little impact vibration as possible, and mounting the angular velocity sensor to a substrate via an impact absorbing material or the like, this involves the problem of restricting the component layout of the imaging apparatus or driving up cost.

Although the above-mentioned problem of impact vibration can be overcome by applying the technique disclosed in Japanese Unexamined Patent Application Publication No. 2000-152057 so that the front curtain is always effected by an electronic focal plane shutter, this brings about another problem of exposure unevenness resulting from the fact that the front curtain is effected by an electronic focal plane shutter and the rear curtain is effected by a mechanical focal plane shutter. That is, the travel characteristics of the curtains of a mechanical focal plane shutter vary with a change in temperature/humidity, a change of posture, secular changes, and the like. Although no serious problem is likely to occur if both the front curtain and the rear curtain are mechanical focal plane shutters because both the front curtain and the rear curtain undergo substantially the same variations, since an electronic focal plane shutter does not undergo such variations in travel characteristics, exposure unevenness occurs due to a difference in curtain speed between the front curtain and the rear curtain. Such exposure unevenness becomes particularly noticeable when shooting at fast SS (shutter speed) during which slit exposure occurs, which makes it impossible to achieve stable exposure.

The present invention has been made in view of the above-mentioned circumstances, and accordingly it is an object of the present invention to provide an imaging apparatus with shake correction function incorporating a CMOS imaging device, with which shake correction can be appropriately performed practically free from the influence of vibration due to curtain travel of a mechanical focal plane shutter while suppressing the occurrence of exposure unevenness.

DISCLOSURE OF INVENTION

According to Claim 1 of the present invention, there is provided an imaging apparatus which includes a CMOS imaging device having a plurality of pixels arrayed in a matrix, including: shake detection means for detecting an amount of shake applied to the imaging device; shake correction means for performing a shake correction drive of a predetermined structure on the basis of a shake amount detection signal from the shake detection means; a mechanical focal plane shutter including a curtain that moves in a direction substantially orthogonal to a predetermined pixel line of the imaging device, the mechanical focal plane shutter being configured to perform an optical-path opening operation and an optical-path blocking operation for opening and blocking an optical path of light guided to the imaging device; timing signal generating means for supplying a predetermined reset signal to each of the pixels on the pixel line basis so as to start exposure on the imaging device; and control means for controlling exposure of the imaging device. The control means is capable of executing a first exposure start control for starting exposure on the imaging device by the optical-path opening operation by the mechanical focal plane shutter, and a second exposure start control for starting exposure on the imaging device by the reset signal supplied to each of the pixels from the timing signal generating means, the second exposure start control being selected in a shake-correction execution mode during which a shake correction operation by the shake correction means is actually performed.

According to this configuration, when in the shape-correction execution mode during which a shake correction operation is actually performed, the control means executes a second exposure start control for starting exposure by a so-called electronic focal plane shutter, with which exposure on the imaging device is started by means of a reset signal supplied to each of the pixels from the timing signal generating means (adoption of an electronic focal plane shutter as the front curtain). On the other hand, when not in the shake-correction execution mode, the control means executes a first exposure start control for starting exposure on the imaging device by means of an optical-path opening operation by a mechanical focal plane shutter (adoption of a mechanical focal plane shutter as the front curtain). Since vibration due to curtain travel thus exerts no influence during operation in the shake-correction execution mode, vibration due to curtain travel is not erroneously detected as a camera shake or the like to be outputted as an erroneous signal by the shake detection means, thereby allowing an appropriate shake correction operation to be performed by the shake correction means. On the other hand, when a shake correction operation is not performed, the front curtain and the rear curtain are both effected by a mechanical focal plane shutter, so the occurrence of exposure unevenness is suppressed.

With regard to the above-mentioned configuration, a configuration can be adopted in which the imaging apparatus further includes operating means for allowing setting of whether or not to execute a shake correction operation by the shake correction means, and in which the control means determines that the current state is the shake-correction execution mode and selects the second exposure start control when an operation signal for executing a shake correction operation by the shake correction means is supplied from the operating means (Claim 2).

According to this configuration, the determination whether to adopt an electronic focal plane shutter (second exposure start control) or a mechanical plane foal shutter (first exposure start control) as the front curtain is made in accordance with a determination criterion based on whether or not an operation signal for executing a shake correction operation is supplied from the operating means.

Further, with regard to the above-mentioned configuration, a configuration can be adopted in which the control means determines that the current state is the shake-correction execution mode and selects the second exposure start control when a shake amount detection signal detected by the shake detection means is equal to or larger than a predetermined value (Claim 3).

According to this configuration, when an amount of shake equal to or larger than a predetermined value is applied to the imaging apparatus, an electronic focal plane shutter is adopted as the front curtain. Further, when, although the imaging apparatus is in a state where shake correction can be executed, an amount of shake equal to or larger than a predetermined value is not detected, a mechanical focal plane shutter is adopted as the front curtain.

In any one of the above-mentioned configurations, it is desirable that the imaging apparatus further include supporting-leg detecting means for detecting whether or not a supporting leg is attached to the imaging apparatus directly or indirectly on the basis of another parameter, and that the control means select the first exposure control when attachment of the supporting leg to the imaging apparatus is detected by the supporting-leg detecting means (Claim 4).

When a supporting leg such as a tripod is attached to the imaging apparatus, the posture of the imaging apparatus is stabilized, so shake correction is generally unnecessary. According to the above-mentioned configuration, the attachment state of the supporting leg is automatically detected, and when the supporting leg is attached, a mechanical focal plane shutter is adopted as the front curtain, thereby suppressing the occurrence of exposure unevenness as much as possible.

Further, with regard to the above-mentioned configuration, a configuration can be adopted in which the imaging apparatus further includes exposure control means for setting at least a shutter speed, and in which the control means determines that the current state is the shake-correction execution mode and selects the second exposure start control, when an operation signal for executing a shake correction operation by the shake correction means is supplied from the operating means, and a shutter speed set by the exposure control means is lower than a predetermined value (Claim 5).

When shooting at fast SS with the shutter speed being faster than a predetermined value, the influence of camera shake vibration that is only a shake on the order of 1 to 10 Mz hardly appears on the captured image, so shake correction is generally unnecessary when shooting at fast SS. On the other hand, exposure unevenness resulting from a difference in curtain speed between the front curtain and the rear curtain is liable to occur when shooting at fast SS. According to the above-mentioned configuration, even when the imaging apparatus is set in a state where shake correction can be executed (state where an operation signal for executing a shake correction operation is supplied from the operating means), when shooting at fast SS (when no shake correction is actually executed), occurrence of exposure unevenness is suppressed by executing both the front curtain and the rear curtain by a mechanical focal plane shutter. On the other hand, when shooting at slow SS (when shake correction is executed), an electronic focal plane shutter is adopted as the front curtain, thereby making it possible to prevent the shake detection means from being subjected to the influence of vibration due to curtain travel.

In this case, it is desirable that the control means determine that a shutter speed is lower than a predetermined value when the shutter speed is set longer than ½ of a flash sync shutter speed in the mechanical focal plane shutter (Claim 6). Further, assuming that a focal length in 135 system equivalent of a shooting optical system included in the imaging apparatus is f (mm), it is desirable that the control means determine that the shutter speed is lower than the predetermined value when the shutter speed is set longer than 1/f (Claim 7).

According to these configurations, whether to adopt an electronic focal plane shutter or a mechanical focal plane shutter as the front curtain is determined by a parameter based on the flash sync shutter speed (sync speed) or the focal length.

Further, in the above-mentioned configuration, it is desirable that the imaging apparatus be configured so that a taking lens is interchangeable with respect to an imaging apparatus body portion, and that the shake detection means be included in the imaging apparatus body portion (Claim 8). In an imaging apparatus with an interchangeable taking lens such as a single-lens reflex type digital camera, when the shake detection means is mounted in the imaging apparatus body portion, the shake detection means becomes very susceptible to the influence of vibration due to the curtain travel of a mechanical focal plane shutter. Therefore, a remarkable misoperation suppressing effect can be attained by adopting an electronic focal plane shutter as the front curtain during operation in the shake-correction execution mode.

In any of the above-mentioned configurations, it is desirable that the structure subjected to a shake correction drive by the shake correction means be the imaging device (Claim 9). According to this configuration, in an imaging apparatus including a shake correction mechanism of an imaging device oscillation type, it is possible to prevent the imaging device from being subjected to a shake correction drive on the basis of an erroneous signal.

According to the invention as set forth in Claim 1, since an electronic focal plane shutter is adopted as the front curtain when in the shake-correction execution mode, the shake correction mechanism is not susceptible to the influence of vibration due to curtain travel. Further, since a mechanical focal plane shutter is adopted as the front curtain when no shake correction operation is performed, occurrence of a difference in curtain speed between the front curtain and the rear curtain is suppressed. Accordingly, there is no fear of inappropriate shake correction being performed on the basis of an erroneous shake amount detection signal, and also occurrence of exposure unevenness is suppressed. Therefore, in an imaging apparatus with shake correction function incorporating a CMOS imaging device, a clear image can be obtained both during operation and non-operation of the shake correction function.

According to the invention as set forth in Claim 2, the determination criterion is whether or not an operation signal for executing a shake correction operation is supplied from the operating means. Therefore, the control sequence can be simplified.

According to the invention as set forth in Claim 3, since the size of the shake amount detected by the shake detection means serves as the determination criterion, whether or not to adopt an electronic focal plane shutter as the front curtain is determined in consideration of the practical necessity of shake correction, thereby enabling even more appropriate selection of the front curtain type.

According to the invention as set forth in Claim 4, when a supporting leg such as a tripod is attached to the imaging apparatus, it is assumed that no shake will occur, and a mechanical focal plane shutter is adopted as the front curtain. Therefore, it is possible to further reduce the probability of occurrence of exposure unevenness resulting from a difference in curtain speed between the front curtain and the rear curtain.

According to the invention as set forth in Claim 5, the shutter speed set by the exposure control means serves as the determination criterion. Therefore, whether or not to adopt an electronic focal plane shutter as the front curtain is determined in consideration of the practical necessity of shake correction, thereby enabling even more appropriate selection of the front curtain type.

According to the invention as set forth in Claim 6, since the selection of the front curtain type is made by using a simple parameter such as a parameter based on the sync speed, the front curtain type determining operation by the control means can be simplified.

According to the invention as set forth in Claim 7, since the selection of the front curtain type is made by using a simple parameter such as a parameter based on the focal length, the front curtain type determining operation by the control means can be simplified.

According to the invention as set forth in Claim 8, with regard to, for example, a single-lens reflex type digital camera whose shake detection means is mounted in the imaging apparatus body portion, a shake correction operation based on an erroneous signal is suppressed, thereby making it possible to improve the precision of shake correction.

According to the invention as set forth in Claim 9, in an imaging apparatus including a shake correction mechanism of an imaging device oscillation type, a shake correction operation based on an erroneous signal is suppressed, thereby making it possible to improve the precision of shake correction.

BEST MODE FOR CARRYING OUT THE INVENTION

An embodiment of the present invention will now be described with reference to the drawings.

(Description of Exterior Construction of Camera)

Figure 1:
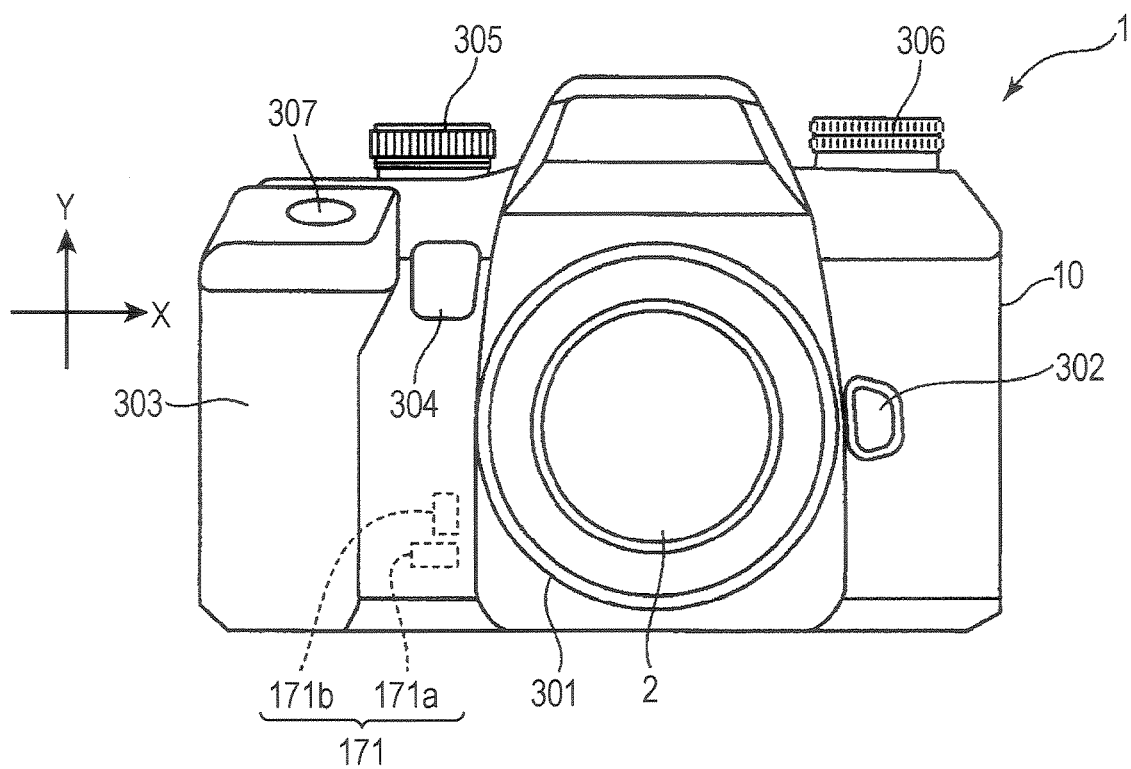
FIG. 1 is a front exterior view of a digital camera (imaging apparatus) incorporating an imaging unit according to the present invention.
Figure 2:
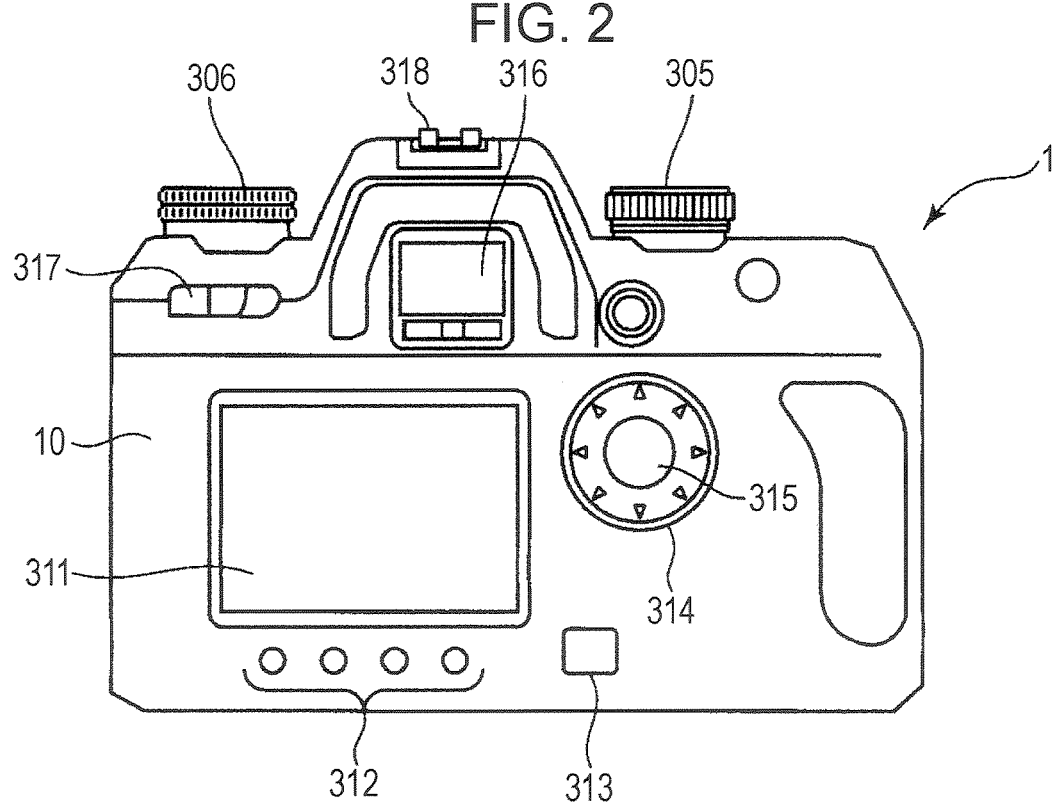
FIG. 2 is a rear view of the digital camera shown in FIG. 1.

FIGS. 1 and 2 are views showing the exterior structure of a digital camera 1 (imaging apparatus) according to an embodiment of the present invention. FIG. 1 is a front exterior view of the digital camera 1, and FIG. 2 is a rear exterior view of the digital camera 1. As shown in FIG. 1, the digital camera 1 is a single-lens reflex type digital still camera including a camera body 10, and a taking lens 2 (interchangeable lens) detachably (interchangeably) mounted at substantially the center of the front surface of the camera body 10.

In FIG. 1, on the front surface side of the camera body 10, there are provided a mount section 301 which is located substantially at the center of the front surface and on which the taking lens 2 is mounted, a lens exchange button 302 arranged to the right of the mount section 301, a grip section 303 which is provided so as to protrude at the left end of the front surface (left side in the X direction) and can be securely gripped (held) by the user with one hand (or with both hands), an AF auxiliary light emitting section 304 arranged to the left of the mount section 301, a mode-setting dial 305 arranged in an upper left portion of the front surface (upper side in the Y direction), a control-value setting dial 306 arranged in an upper right portion of the front surface (upper left side in the Y direction), and a shutter button 307 arranged in an upper surface of the grip section 303.

Further, in FIG. 2, on the rear surface side of the camera body 10, there are provided an LCD (Liquid Crystal Display) 311 arranged at the left side of the rear surface, a setting button group 312 arranged below the LCD 311, a camera shake correction switch 313 (operating means) arranged adjacent to the setting button group 312, a cross cursor key 314 arranged by the side of the LCD 311, a push button 315 arranged at the center of the cross cursor key 314, a push button 315 arranged at the center of the cross cursor key 314, an optical viewfinder 316 disposed above the LCD 311, a main switch 317 disposed by the side of the optical viewfinder 316, and a connecting terminal section 318 disposed above the optical viewfinder 316.

The mount section 301 is a portion on which the taking lens 2 is mounted. A plurality of electrical contacts for effecting electrical connection with the mounted taking lens 2, a coupler (not shown) for effecting mechanical connection, and the like are provided near the mount section 301. The lens exchange button 302 is a button that is depressed when detaching the taking lens 2 mounted on the mount section 301.

The grip section 303 is a portion of the digital camera 1 which is gripped by the user during shooting. The grip section 303 is provided with surface irregularities conforming to the shape of the fingers for enhanced fitting. It should be noted that a battery storage chamber and a card storage chamber are provided inside the grip section 303. A battery as a camera power source is stored in the battery storage chamber. A recording medium (for example, a memory card) for recording image data of captured images is detachably stored in the card storage chamber. It should be noted that the grip section 303 may be provided with a grip sensor for detecting whether or not the grip section 303 has been gripped by the user.

The AF auxiliary light emitting section 304 includes a light emitting element such as an LED, and outputs auxiliary light when performing focus control in a case where the brightness or contrast of a subject is low.

The mode setting dial 305 and the control-value setting dial 306 are each formed by a substantially disc-shaped member that is rotatable within a plane substantially parallel to the upper surface of the camera body 10. The mode setting dial 305 is used for selectively choosing between modes and functions incorporated in the digital camera 1, including the automatic exposure (AE) control mode and auto focus (AF) control mode, various shooting modes such as the still picture shooting mode for shooting a single still picture or continuous shooting mode for performing continuous shooting, or the playback mode for playing back a recorded image. The control-value setting dial 306 is used to set control values with respect to various functions incorporated in the digital camera 1.

The shutter button 307 is a depression switch that allows a "half press" operation with the shutter button 307 pressed halfway down, and a "full press" operation with the shutter button 307 further pressed down. When the shutter button 307 is pressed halfway (S1) in the still picture shooting mode, preparatory operations (preparatory operations such as setting of an exposure control value and focus control) for shooting a still picture of a subject are executed, and when the shutter button 307 is fully pressed (S2), shooting operations (a series of operations including performing exposure on an image sensor, applying predetermined image processing to an image signal obtained by the exposure, and recording the resulting image into a memory card or the like). It should be noted that a half-press operation on the shutter button 307 is detected by a switch S1 (not shown) being turned on, and a full-press operation on the shutter switch 307 is detected by a switch S2 (not shown) being turned on.

The LCD 311 includes a color liquid crystal panel. The LCD 311 performs display of an image captured by an imaging device 101 (see FIG. 4 and the like), playback display of a recorded image, and the like, and also performs display of a setting screen for the functions and modes incorporated in the digital camera 1. It should be noted that an organic EL or a plasma display may be used instead of the LCD 311.

The setting button group 312 is a group of buttons for performing operations with respect to various functions incorporated in the digital camera 1. The setting button group 312 includes, for example, a selection determination switch for determining the contents selected on a menu screen displayed on the LCD 311, a selection cancellation switch, a menu display switch for switching over the contents displayed on the menu screen, a display on/off switch, a display enlargement switch, and the like.

The camera shake correction switch 313 is a button for supplying an operation signal for executing a shake correction operation by a shake correction unit 200 that will be described later. The shake correction switch 313 is depressed by the user in situations where the influence of "shake" such as camera shake may appear in captured images, such as during handheld shooting, telephoto shooting, shooting in dark places, or shooting that requires long exposure, and sets the digital camera 1 ready for a shake correction operation.

The cross cursor key 314 has an annular member including a plurality of pressing portions (portions indicated by triangular marks in the drawing) that are arranged at a fixed interval in the circumferential direction. The cross cursor key 314 is configured so that a pressing operation on each pressing portion is detected by means of a contact (switch) (not shown) provided in association with each one of the pressing portions. The push button 315 is arranged at the center of the cross cursor key 314. The cross cursor key 314 and the push button 315 are used for inputting designations regarding a change of the zoom ratio (movement of a zoom lens in a wide-angle direction or in a telephoto direction), feeding of frames of recorded images to be played back on the LCD 311, setting of shooting conditions (such as the aperture value, the shutter speed, and firing/non-firing of flash).

The optical viewfinder 316 is adapted to optically display the shooting range of a subject. Specifically, a subject image from the taking lens 2 is guided to the optical viewfinder 316 so that the user can view the subject image to be actually captured by the imaging device 101 through the optical viewfinder 316.

The main switch 317 is a two-contact slide switch that slides to the left and right. When the main switch 317 is set to the left position, the power of the digital camera 1 is turned on, and when the main switch 317 is set to the right position, the power of the digital camera 1 is turned off. The connecting terminal section 318 is a terminal for connecting the digital camera 1 to an external device such as a flash device (not shown).

As indicated by dotted lines in FIG. 1, the digital camera 1 has a shake detection sensor 171 (shake detection means)

mounted at a suitable location of the camera body 10. The shake detection sensor 171 is adapted to detect a shake applied to the camera body 10 (imaging apparatus body section). Assuming a two dimensional coordinate system with the horizontal direction in FIG. 1 taken as the X axis (pitch direction) and the direction perpendicular to the X axis taken as the Y axis (yaw direction), the shake detection sensor 171 has a pitch sensor 171a for detecting camera shake in the pitch direction, and a yaw sensor 171b for detecting camera shake in the yaw direction. The pitch sensor 171a and the yaw sensor 171b are each formed by a gyro (angular velocity sensor) using a piezoelectric device, for example, and adapted to detect the angular velocity of a shake in each direction.

The taking lens 2 functions as a lens aperture for receiving light (optical image) from a subject, and constitutes a shooting optical system, which will be described later, for guiding the subject's light to the imaging device 101 and to the optical viewfinder 316 arranged within the camera body 10. The taking lens 2 is detachable from the camera body 10 (and hence is an interchangeable taking lens) by pressing the lens exchange button 302 described above.

The taking lens 2 includes a lens group 21 (see FIG. 4) including a plurality of lens arranged serially along the optical axis L. The lens group 21 includes a focus lens 211 (see FIG. 9) for focus control, and a zoom lens 212 for zooming. Zooming and focus control are effected by moving the focus lens 211 and the zoom lens 212 in the optical axis L direction. The taking lens 2 includes an operation ring that is provided at a suitable outer circumferential location of a lens barrel 22 so as to be rotatable along the outer circumference of the lens barrel 22. The zoom lens is manually or automatically moved to a given position in the optical axis direction in accordance with the rotation direction and rotation amount of the operation ring to be set to a zoom ratio (shooting magnification) corresponding to that position.

(Description of Internal Configuration of Camera)

Figure 3:
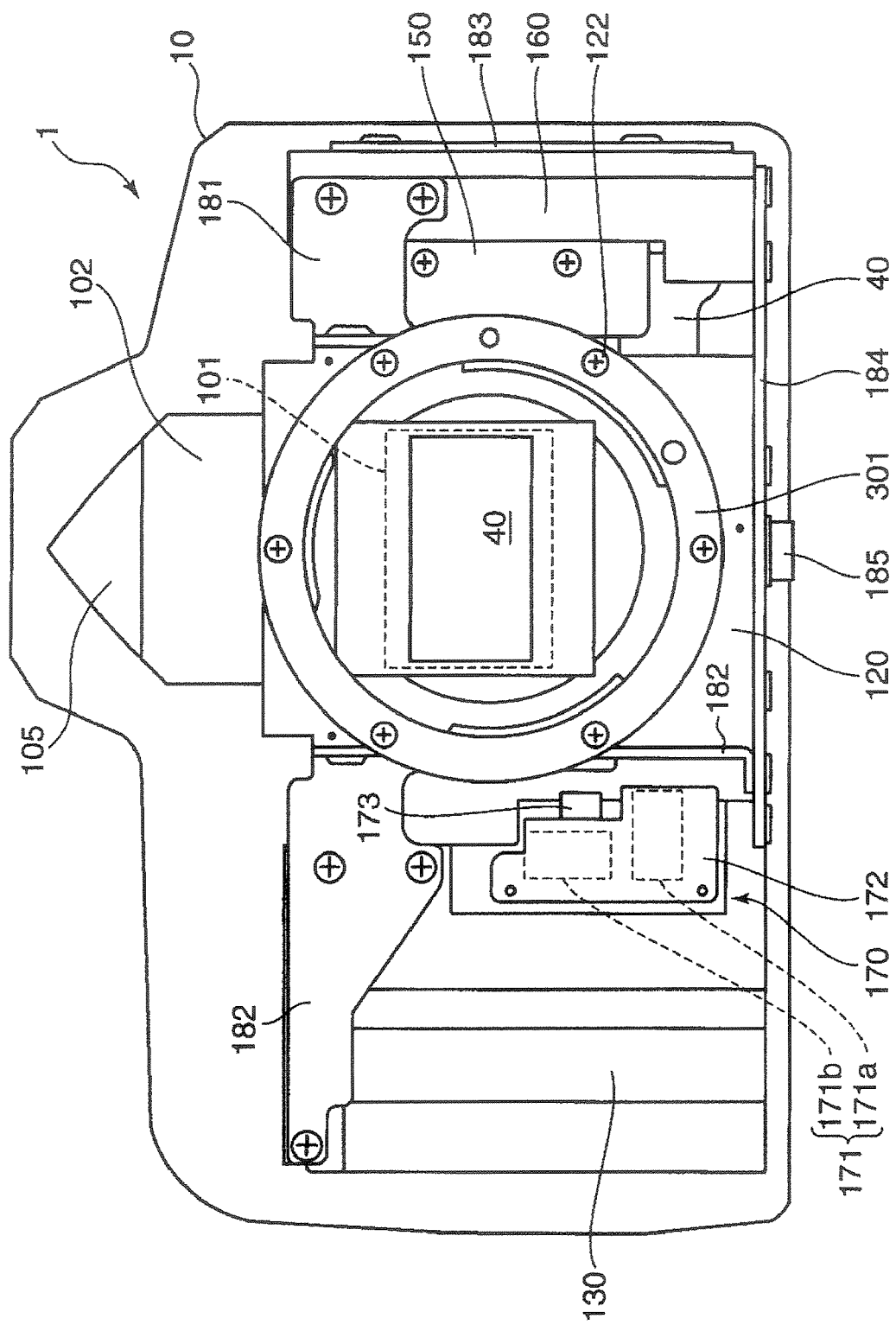
FIG. 3 is a front perspective view of the digital camera.
Figure 4:
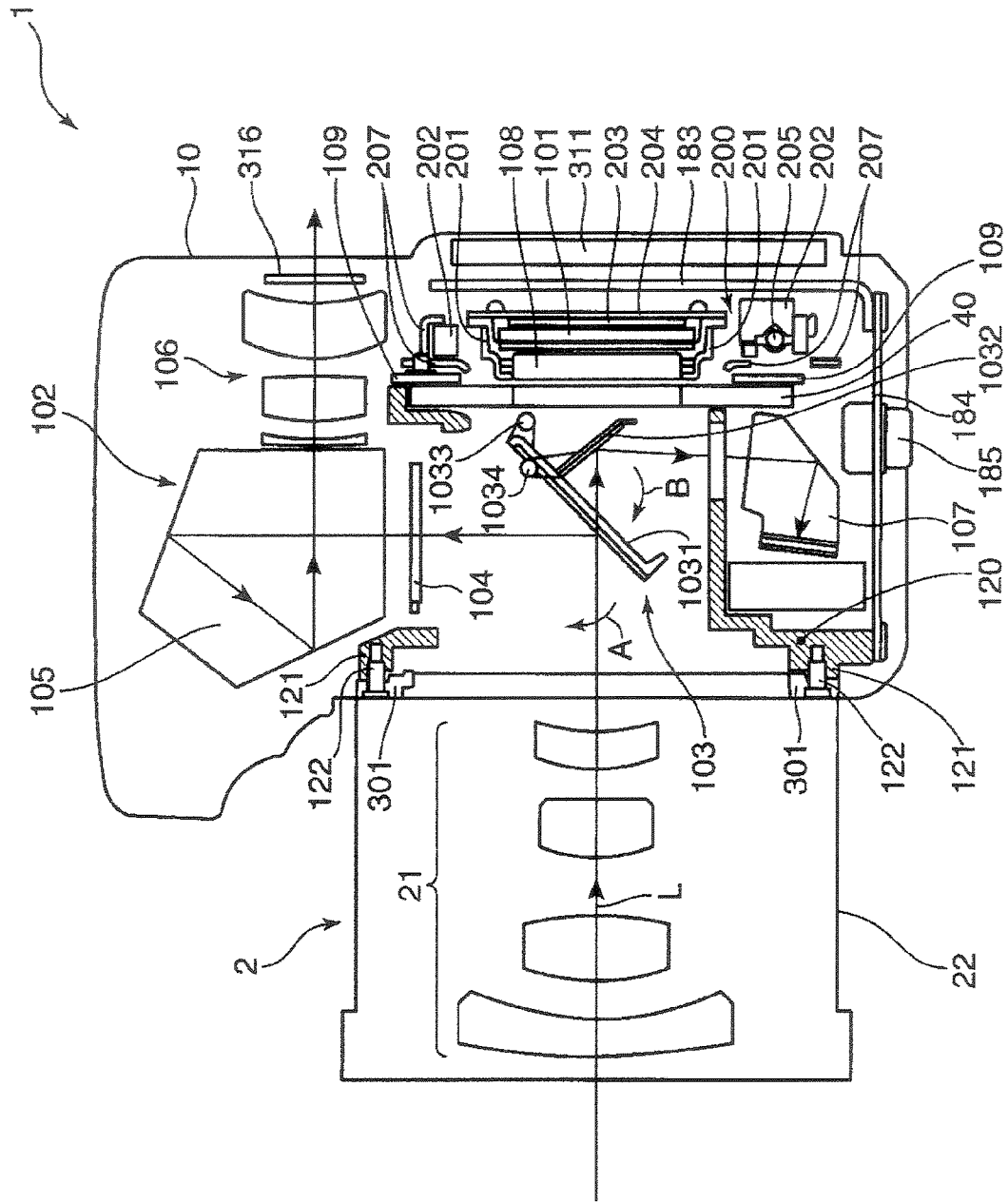
FIG. 4 is a side section view showing the internal structure of the digital camera.
Figure 5:
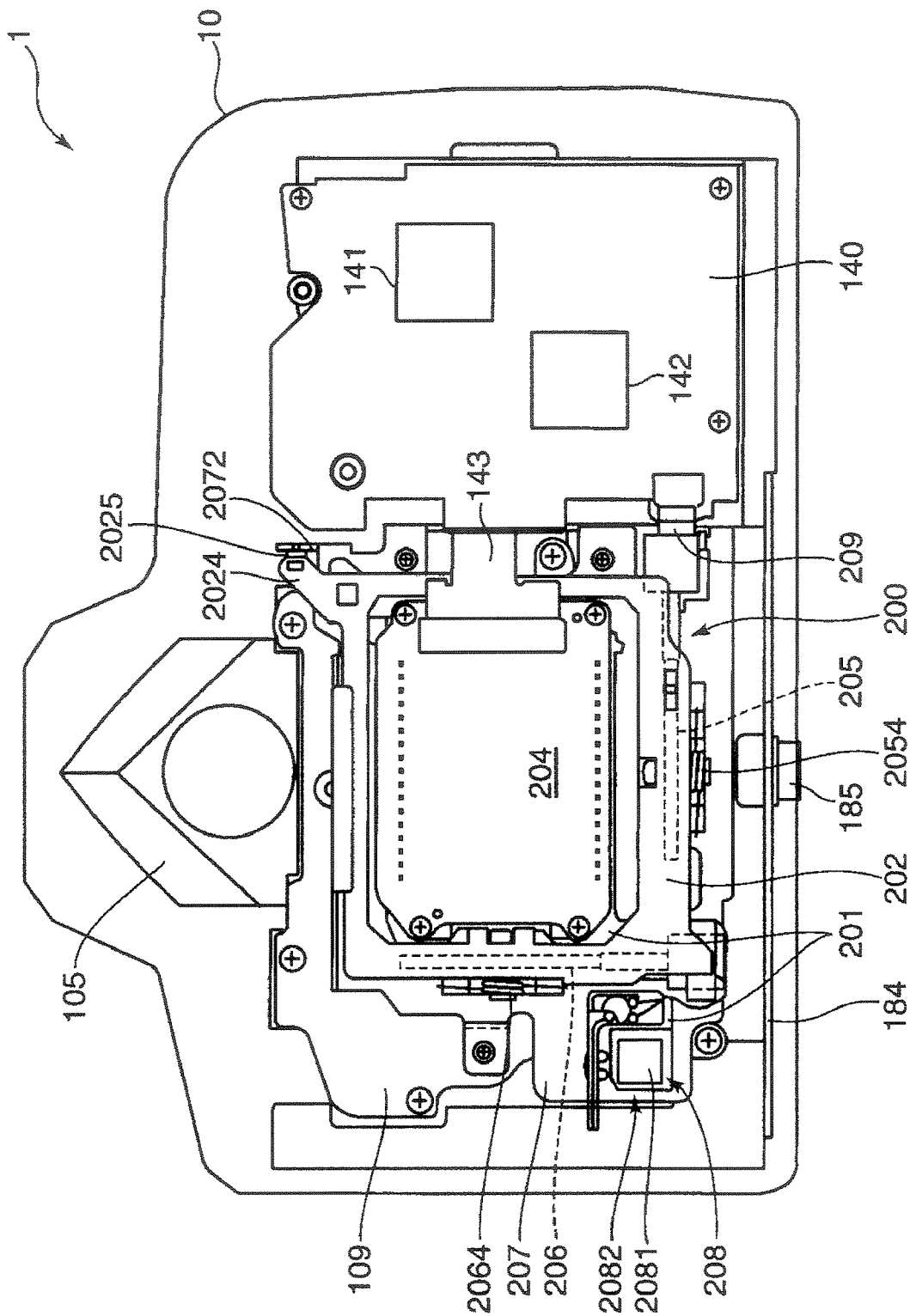
FIG. 5 is a rear perspective view of the digital camera.

Next, the internal configuration of the digital camera 1 will be described. FIG. 3 is a front perspective view of the camera body 10 of the digital camera 1, FIG. 4 is a side sectional view of the digital camera 1, and FIG. 5 is a rear perspective view of the camera body 10. As shown in FIGS. 3 to 5, in the camera body 10, there are provided the imaging device 101, a viewfinder section 102 (viewfinder optical system), a mirror section 103, a focus detecting section 107, the above-described shake detection sensor 171, the shake correction unit 200, a shutter unit 40, and the like.

The imaging device 101 is arranged on the optical axis L (see FIG. 4) of the lens group 21 included in the taking lens 2 with the taking lens 2 mounted on the camera body 10, so as to be orientated perpendicular to the optical axis L. The imaging device 101 is, for instance, a CMOS color area sensor (CMOS imaging device) of a Bayer matrix in which a plurality of pixels each including a photodiode are arrayed in a two-dimensional matrix, and color filters in R (red), G (green), and B (blue) having different spectral characteristics from each other are disposed on light receiving surfaces of the respective pixels at a ratio of 1:2:1. The imaging device 101 converts an optical image of a subject formed by the lens group 21 into analog electrical signals (image signals) of respective color components of R (red), G (green), and B (blue), and outputs the electrical signals as image signals of the respective colors of R, G, and B.

The mirror section 103 (reflecting plate) is arranged at a position on the optical axis L for reflecting the subject's light toward the viewfinder section 102. The subject's light that has passed through the taking lens 2 is reflected upward by the mirror section 103 (a main mirror 1031 that will be described later), and an image of the subject is formed on a focusing screen 104 (focusing glass). A part of the subject's light that has passed through the taking lens 2 transmits through the mirror section 103.

The viewfinder section 102 includes a pentaprism 105, an eyepiece lens 106, and the optical viewfinder 316. The pentaprism 105 has a pentagonal cross section, and is a prism for turning the optical image of a subject entering from its lower surface upside down and left-to-right by internal reflection, thereby forming an erect image. The eyepiece lens 106 guides the subject image thus turned into an erect image by the pentaprism 105 to the outside of the optical viewfinder 316. Due to this configuration, in shooting standby, the viewfinder section 102 functions as an optical viewfinder for checking the view field.

The mirror section 103 includes the main mirror 1031 and a sub mirror 1032. On the rear surface side of the main mirror 1031, the sub mirror 1032 is provided in such a way that the sub mirror 1032 is pivotable so as to tilt toward the rear surface of the main mirror 1031. A part of the subject's light that has transmitted through the main mirror 1031 is reflected by the sub mirror 1032, and the reflected subject's light is made incident on a focus detection section 107.

The above-mentioned mirror section 103 is a so-called quick return mirror. At the time of exposure, the mirror section 103 flips upward as indicated by the arrow A about a rotational axis 1033 as a pivot point, and stops at a position below the focusing screen 104. At this time, the sub mirror 1032 pivots about a rotational axis 1034 in the direction indicated by the arrow B with respect to the rear surface of the main mirror 1031, and when the mirror section is stopped at a position below the focusing screen 104, the sub mirror 1032 is in a folded-down state so as to be substantially parallel to the main mirror 1031. This allows the subject's light from the taking lens 2 to reach the imaging device 101 without being blocked by the mirror section 103, thereby exposing the imaging device 101 to the light. Upon finishing the exposure, the mirror section 103 returns to the original position (position shown in FIG. 4).

The focus detection section 107 is a so-called AF sensor formed by a distance measuring device or the like for detecting the focus information for a subject. The focus detection section 107 is disposed at the bottom of the mirror section 103 and serves to detect a focus position by a known phase difference detection method.

The imaging device 101 is held so as to be movable two-dimensionally within a plane orthogonal to the optical axis L in the shake correction unit 200. The structure and operation of the shake correction unit 200 will be described later in detail with reference to FIG. 8. Further, a low pass filter 108 (optical filter) for preventing generation of false color or color moiré is arranged immediately in front of the imaging device 101 with respect to the optical axis direction. Further, the shutter unit 40 is arranged immediately in front of the low pass filter 108. The shutter unit 40 is a mechanical focal plane shutter which includes a curtain that moves in a direction substantially orthogonal to a predetermined pixel line of the imaging device 101, and which performs the operation of opening and blocking the optical path of the subject's light being guided toward the imaging device 101 along the optical axis L. The detailed configuration of the shutter unit 40 will be described later with reference to FIGS. 6 and 7.

As shown in FIG. 3, a frame member 120 (front frame) is arranged substantially at the center of the camera body 10 in rear of the mount section 301 (see the hatched portion in FIG. 4). The frame member 120 is a square cylinder having a substantially square shape in front view which is open at the front and rear faces and at the upper face opposed to the pentaprism 105 (focusing screen 104). The frame member 120 is a rigid body made of metal which exhibits strength against distortions or the like. A cylindrical mount-receiving section 121 is formed on the front face of the frame member 120 in conformity to the shape of the mount section 301. With the mount section 301 fitted in the mount-receiving section 121, the mount section 301 is secured into place with a plurality of screws 122 from the front face side. The frame member 120 has the mirror section 103 arranged therein, and thus doubles as a holding member for holding the mirror section 103. It should be noted that the shutter unit 40 is supported on the frame member 120 while being held between the rear end of the frame member 120 and a shutter pressing plate 109 arranged on the rear side thereof.

A battery unit 130 is arranged on the left side of the frame member 120 (inside the grip section 4). The battery unit 130 stores a predetermined number of AA batteries, for example, as an operation power source for the digital camera 1. Although not shown, a card storage section for detachably storing a memory card for recording image data of captured images is provided adjacent to the batter unit 130.

As shown in FIG. 5, a control board 140 is arranged in the rear surface of the battery unit 130. The control board 140 is a board member constituting a main control section 62 that will be described later. On the control board 140, there are mounted such electronic parts as an image processing circuit 141 (which will be described as an image processing section 61 in FIG. 9 later) formed by, for example, an image processing ASIC for performing predetermined signal processing (image processing) on image data, and a shake correction circuit 142 (which will be described as a shock correction control section 622 later) for controlling a shake correction drive that will be described later. It should be noted that the control board 140 and the imaging device 101 are electrically connected to each other by a flexible wiring board 143.

As shown in FIG. 3, a drive unit 150 for driving the mirror section 103 and the shutter unit 40 is arranged adjacent to the right side of the frame member 120. Arranged further to the right side (outer side) from the drive unit 150 is a connector section 160 made of resin such as plastic and serving as a structure including a holder for a remote terminal, a USB terminal, or the like, or an AC power jack or the like.

On the other hand, a shake correction unit 170 formed by a gyro unit or the like is attached adjacent to the left side of the frame member 120. The shake correction unit 170 includes the above-described shake detection sensor 171, a sensor board 172 on which the shake detection sensor 171 is mounted, a flexible wiring board for sensor 173, and the like.

The above-mentioned respective portions of the digital camera 1 are connected (fixed) to each other by a chassis made of a metal material such as iron, for example. In this embodiment, the above-mentioned chassis includes front chassis 181, 182, a side chassis 183, and a bottom chassis 184. These chassis each serve as a support member for supporting the above-mentioned respective parts within the camera body 10. These chassis are fixed to each other with screws, and further the resulting interconnected chassis structure and the frame member 120 are fixed to each other with screws, thereby integrating these members into a single structure. It should be noted that the bottom chassis 184 is provided with a tripod attaching section 185 for attaching a tripod used for fixedly supporting the digital camera 1 in place.

[Description of Shutter Unit]

Figure 6:
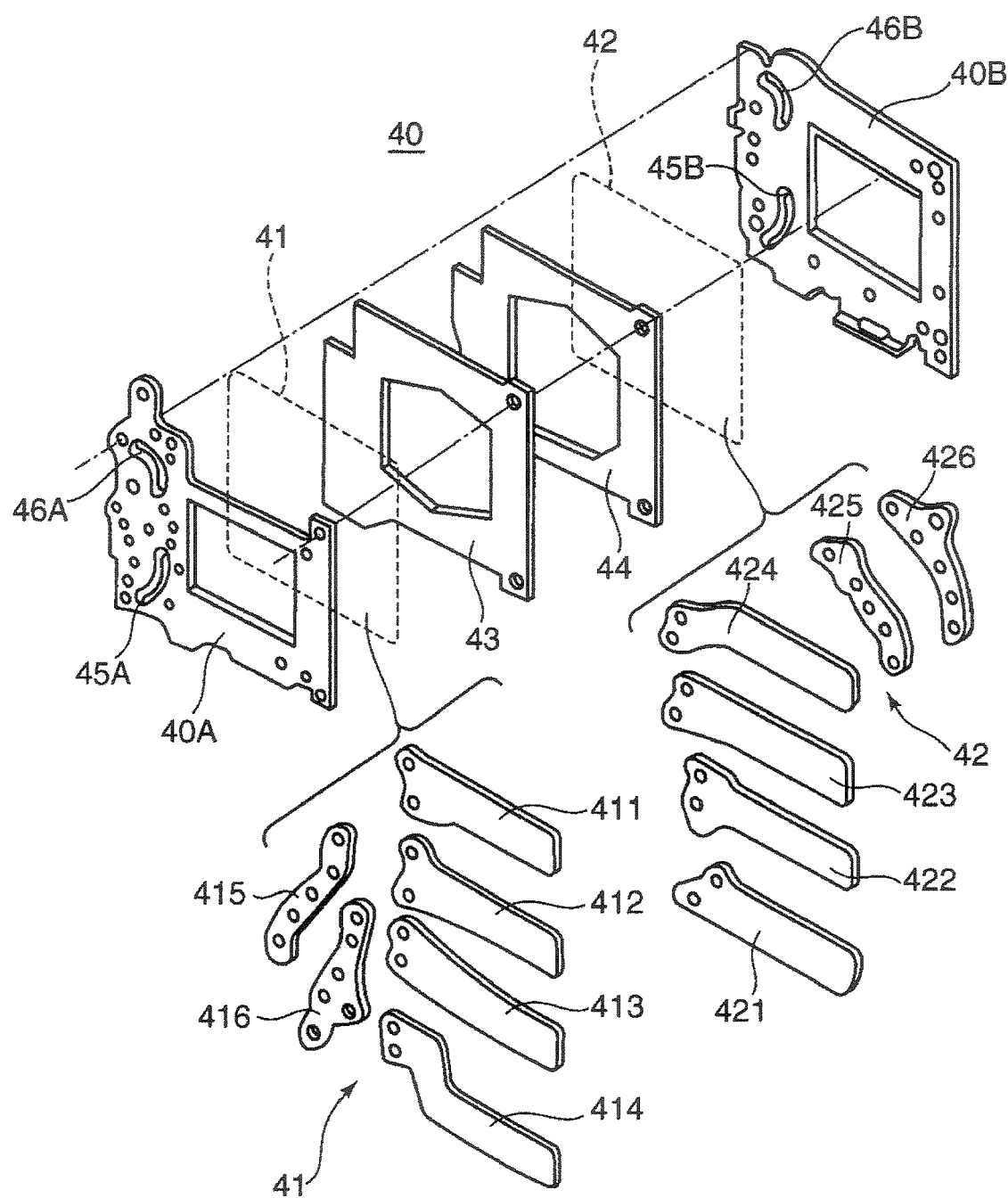
FIG. 6 is an exploded perspective view showing the configuration of a shutter unit.
Figure 7:
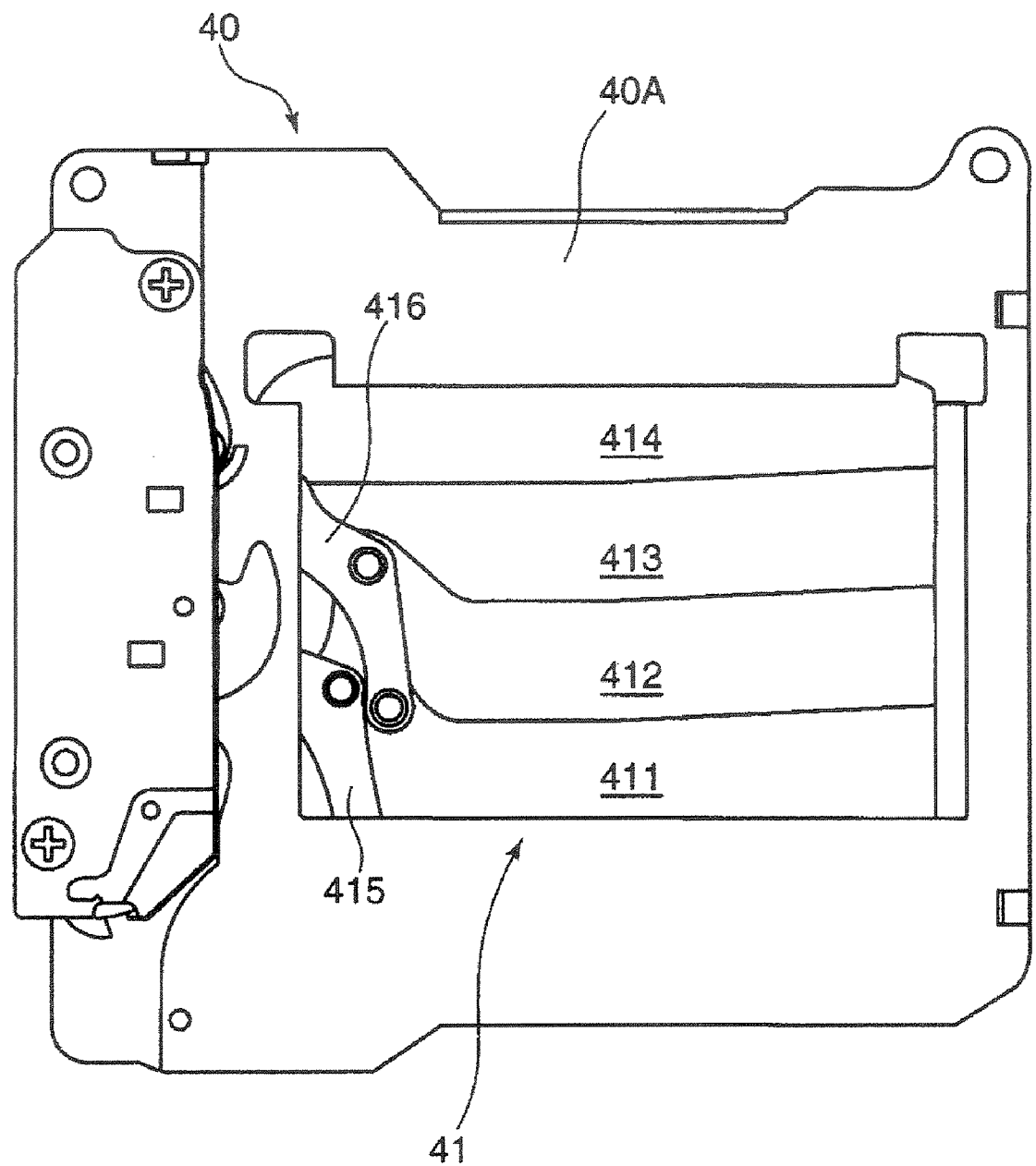
FIG. 7 is a front view of the shutter unit.

FIG. 6 is an exploded perspective view showing the configuration of the shutter unit 40. FIG. 7 is a front view of the shutter unit 40 (with the curtains closed). The shutter unit 40 includes a front curtain group 41, a rear curtain group 42, a light-shielding plate 43, and an intermediate plate 44 provided between a pair of shutter boards 40A, 40B.

The front curtain group 41 includes four split curtains 411 to 414 (curtains), and these split curtains 411 to 414 are connected together by two front-curtain arms 415, 416. As the front-curtain arms 415, 416 are driven by a drive device (a shutter driving actuator 73M shown in FIG. 9) including a predetermined drive shaft, the split curtains 411 to 414 are operated between an unfolded state ("shutter close" state) and an overlapped state ("shutter open" state) The rear curtain group 42 is configured in the same manner, with four split curtains 421 to 424 connected together by two rear-curtain arms 425, 426. It should be noted that a predetermined opening allowing passage of subject's light is formed in each of the light-shielding plate 43 and intermediate plate 44. Further, the shutter boards 40A, 40B are provided with arcuate grooves 45A, 46A and 45B, 46B in which the drive shaft of the above-mentioned drive device is inserted.

In the digital camera 1 according to this embodiment, in accordance with whether or not a shake correction operation is to be performed, that is, whether or not a shake correction drive of the imaging device 101 is to be actually performed by the shake correction unit 200, it is selected whether the above-mentioned optical-path opening operation by the front curtain group 41 (mechanical focal plane shutter) or an electronic focal plane shutter, which involves causing exposure of the imaging device 101 to be started by supplying a reset signal to each pixel of the imaging device 101 at predetermined timing, is used as the front curtain during exposure. It should be noted that as for the rear curtain during exposure, the above-mentioned optical-path blocking operation by the rear curtain group 42 (mechanical focal plane shutter) is used irrespective of whether or not a shake correction operation is to be performed.

That is, when in a shake-correction execution mode during which a shake correction operation is actually performed, the above-mentioned electronic focal plane shutter is used as the front curtain, and the mechanical focal plane shutter based on the operation of the rear curtain group 42 is used as the rear curtain (second exposure start control). On the other hand, when not in the shake-correction execution mode, the mechanical focal plane shutter based on the operation of the front curtain group 41 is used as the front curtain, and the mechanical focal plane shutter based on the operation of the rear curtain group 42 is used as the rear curtain (first exposure start control).

This is to prevent impact vibration, which is generated when the split curtains 411 to 414 of the front curtain group 41 travel so as to open the optical path and come into collision against the shutter boards 40A, 40B at the completion of the opening operation, from being erroneously detected as "vibration applied to the camera body 10" by the shake detection sensor 171, causing an erroneous shake correction drive to be performed. That is, if an electronic focal plane shutter is adopted as the front curtain, no vibration due to curtain travel occurs, thus making it possible to prevent erroneous detection by the shake detection sensor 171. It should be noted that if the electronic focal plane shutter is selected for the front curtain, the above-mentioned front curtain group 41 is brought into the "shutter open" state earlier than the time at which exposure is started. Such a selection control routine for the front curtain will be described later in detail.

[Description of Shake Correction Unit]

Figure 8:
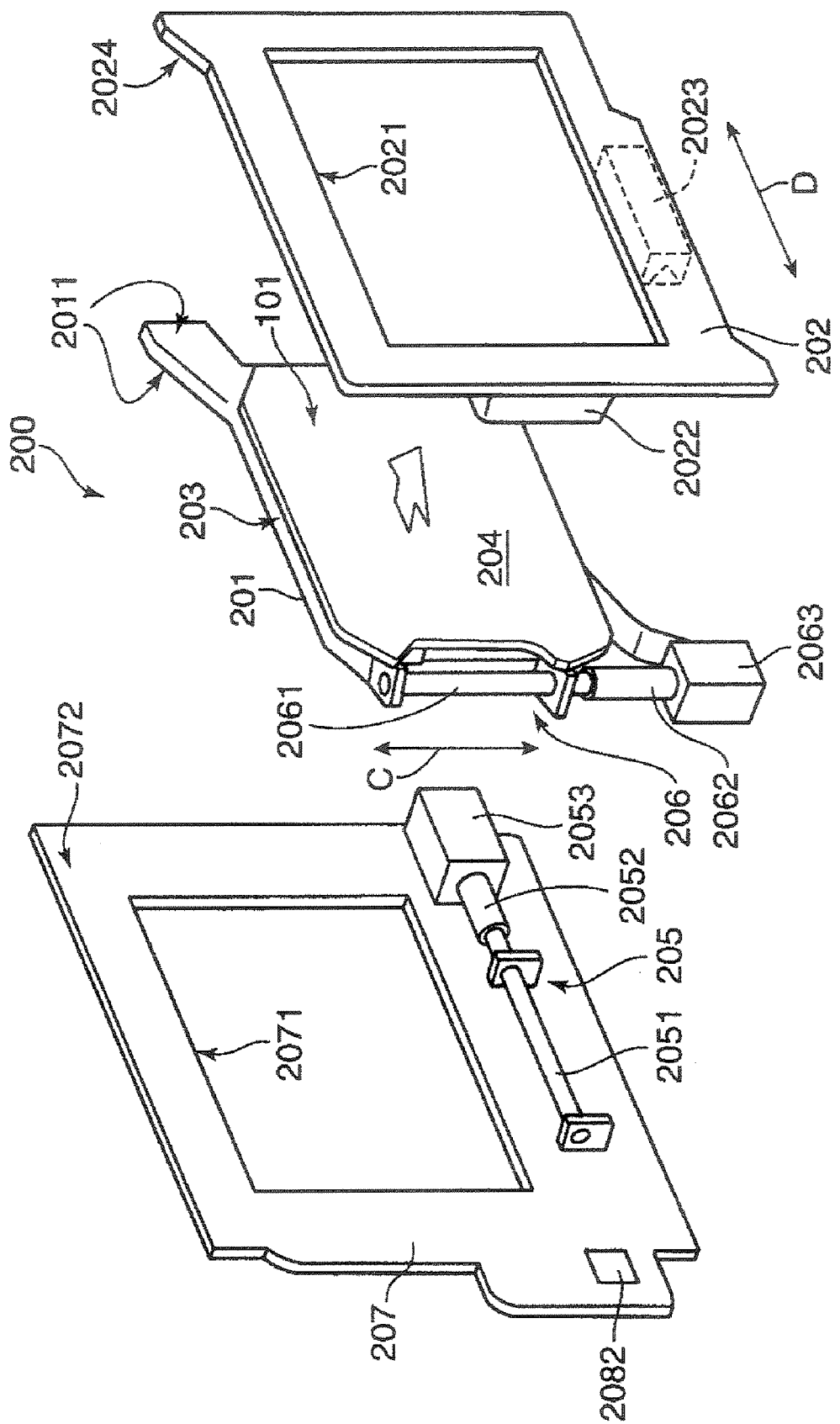
FIG. 8 is an exploded perspective view schematically showing the configuration of a shake correction unit.

Next, referring to FIG. 8 that is an exploded perspective view of the shake correction unit 200 in addition to FIGS. 4 and 5 mentioned above, the configuration of the shake correction unit 200 will be described in detail. The shake correction unit 200 includes the imaging device 101 and the low pass filter 108, an imaging device holder 201 that holds the imaging device 101 as well as the low pass filter 108, a slider 202 that holds the imaging device holder 201, a radiator plate 203 disposed on the rear surface of the imaging device 101, an imaging device board 204 disposed on the rear surface of the radiator plate 203, a yaw actuator 205, a pitch actuator 206, a shake base plate 207, and a position detection sensor section 208.

The imaging device board 204 is a substantially rectangular board on which the imaging device 101 is mounted. It should be noted that this mounting is performed with the radiator plate 203 interposed between the imaging device 101 and the imaging device board 204. The radiator plate 203 is a plate-shaped member made of a predetermined metal material, and serves to release heat generated by the drive (photoelectric conversion) of the imaging device 101. The imaging device holder 201 is a frame member which has a substantially rectangular cross section and is open at the front and at the rear. The low pass filter 108 is attached in front of this frame member, and the imaging device 101 is disposed in rear of the low pass filter 108. The imaging device 101 is pressed against the imaging device holder 201 together with the radiator plate 203 by the imaging device board 204, and in this state, the imaging device 101 is attached into place by securing the imaging device board 204 to the imaging device holder 201 with screws.

The pitch actuator 206 is provided in one end side portion in the lateral direction of the imaging device holder 201 (left side portion in this example). The imaging device holder 201 is attached so as to be slidable in the pitch direction (the vertical direction indicated by the arrow C in FIG. 8) with respect to the slider 202 via the pitch actuator 206. The slider 202 is a substantially flat-shaped frame member having at substantially the central portion thereof a rectangular opening 2021 that is larger than the imaging device board 204.

A bearing section 2022 is secured to a position of the slider 202 opposed to the pitch actuator 206. The bearing section 2022 has formed therein a V groove that is slidably fitted with respect to the pitch actuator 206 (a shaft section 2061 that will be described later) so as to enable the above-mentioned sliding movement. Further, a bearing section 2023 corresponding to the yaw actuator 205 and configured in the same manner as the above-mentioned bearing 2022 is secured to a lower portion of the slider 202. It should be noted that as shown in FIG. 5, the fitting engagement (frictional bonding that will be described later) of a shaft section 2051 (2061) with respect to the bearing section 2022 (2023) is effected with the bearing section 2051 (2061) pinched between a pressing plate (yaw pressing plate/pitch pressing plate) and the bearing section 2022 (2023) due to the urging force exerted by an urging member 2054 (2064) such as a spring.

The shake base plate 207 constitutes a so-called base of the shake correction unit 200 for holding the slider 202 with the imaging device holder 201 held thereon. The shake base plate 207 is a frame member having at substantially the central portion thereof an opening 2071 having approximately the same size as the opening 2021 of the slider 202 (in actuality, the opening 2021 of the slider 202 is slightly larger in size). The yaw actuator 205 is secured to one vertical end side portion (lower side portion in this example) of the shake base plate 207. The slider 202 is attached to the shake base plate 207 so as to be slidable in the yaw direction (lateral direction indicated by the arrow D in FIG. 8) with the bearing section 2023 of the slider 202 slidably fitted with respect to the yaw actuator 205 (shaft section 2051 that will be described later).

Further, at its upper right corner 2072, the shake base plate 207 is joined to a corner 2024 of the slider 202 while being urged by an urging member such as a spring so as to press the corner 2024 of the slider 202 toward the corner 2072 in a state with balls loosely fitted on the back and front surfaces of a corner of the imaging device holder 201 being sandwiched therebetween. Accordingly, the slider 202 is pressed together with the image device holder 201 against the shake base plate 207 in a state permitting the sliding movement of the slider 202 (imaging device holder 201) in the yaw direction and the sliding movement of the imaging device holder 201 in the pitch direction, thereby realizing secure retention to prevent dislodging of these members from the shake base plate 207.

The position detection sensor section (PS) 208 detects the position of the imaging device 101 at the time of shake correction drive or camera startup. The position detection sensor section 208 includes a magnet section 2081 and a two-dimensional Hall sensor 2082. The magnet section 2081 is an element that generates magnetic flux (with particularly high magnetic intensity at the center). The magnet section 2081 is provided at a corner of the imaging device holder 201 (see FIG. 5), and moves integrally with the imaging device holder 201. The two-dimensional Hall sensor 2082 is a sensor in which a predetermined number (four in this example) of Hall elements are arranged two-dimensionally. Each Hall element outputs a signal corresponding to the intensity of the magnetic flux generated by the magnet section 2081. The two-dimensional Hall sensor 2082 is arranged at a position of the shake base plate 207 opposed to the magnet section 2081 and fixed at that position (see FIG. 8). The position detection sensor section 208 detects the position of the magnet section 2081 which moves as the imaging device holder 201 moves vertically and horizontally with respect to the shake base plate 207, thereby detecting the position of the imaging device 101. It should be noted that the position detection sensor section 208 is electrically connected together with the yaw actuator 205 and the pitch actuator 206 to the control board 140 through a second flexible wiring board 209.

Each of the yaw actuator 205 and the pitch actuator 206 is a linear actuator (piezoelectric actuator) of an impact type which performs a so-called ultrasonic drive. These actuators include the shaft sections 2051, 2061, piezoelectric element sections 2052, 2062, weight sections 2053, 2063, and the like, respectively. The shaft sections 2051, 2061 are rod-shaped drive shafts which are respectively vibrated and driven by the piezoelectric element sections 2052, 2062 and have a predetermined cross-sectional shape (such as circular). The shaft sections 2051, 2061 are frictionally coupled to (the V grooves of) the above-mentioned bearing sections 2023, 2022.

The piezoelectric element section 2052 (2062) is formed by ceramics or the like, and expands and contracts in accordance with an applied voltage, causing the shaft section 2051 (2061) to vibrate in accordance with the expansion and contraction. During this expansion and contraction of the piezoelectric section 2052 (2062), high speed expansion and low speed contraction, or low speed expansion and high speed contraction, or constant speed expansion and constant speed extraction in which the expansion speed and the contraction speed are equal, are alternately repeated. The piezoelectric section 2052 (2062) is formed by, for example, a laminated piezoelectric element, and secured to one end of the shaft section 2051 (2061), with its polarizing direction coinciding with the axial direction of the shaft section 2051 (2061).

The electrode portion of the piezoelectric element section 2052 (2062) is connected with a signal line from the control board 140 (shake correction circuit 142). The piezoelectric element section 2052 (2062) is charged or discharged (charged in the reverse direction) in response to a drive signal from the control board 140, thus effecting the expansion and contraction mentioned above. As the piezoelectric element section 2052 (2062) repeatedly expands and contracts in this way, the bearing section 2023, that is, the slider 202, moves forward and backward relative to the shaft section 2051 (or the shaft section 2061 moves relative to the bearing section 2022, that is, the slider 202), or stops at the position to which it has moved. Secured to an end of the shaft section 2051 (2061) opposite to the piezoelectric element section 2052 (2062) is the weight section 2053 (2063), that is, a weight for ensuring that the vibration generated by the piezoelectric element section 2052 (2062) be efficiently transmitted to the shaft section 2051 (2061).

As described above, the slider 202 and the imaging device holder 201 slide integrally in the lateral direction with respect to the shake base plate 207 in response to the drive of the yaw actuator 205, thereby correcting the shake of the imaging device 101 in the yaw direction (arrow D direction). Likewise, the imaging device holder 201 slides vertically with respect to the slider 202 in response to the drive of the pitch actuator 206, thereby correcting the shake of the imaging device 101 in the pitch direction (arrow C direction).

(Description of Electrical Configuration of Digital Camera)

Figure 9:
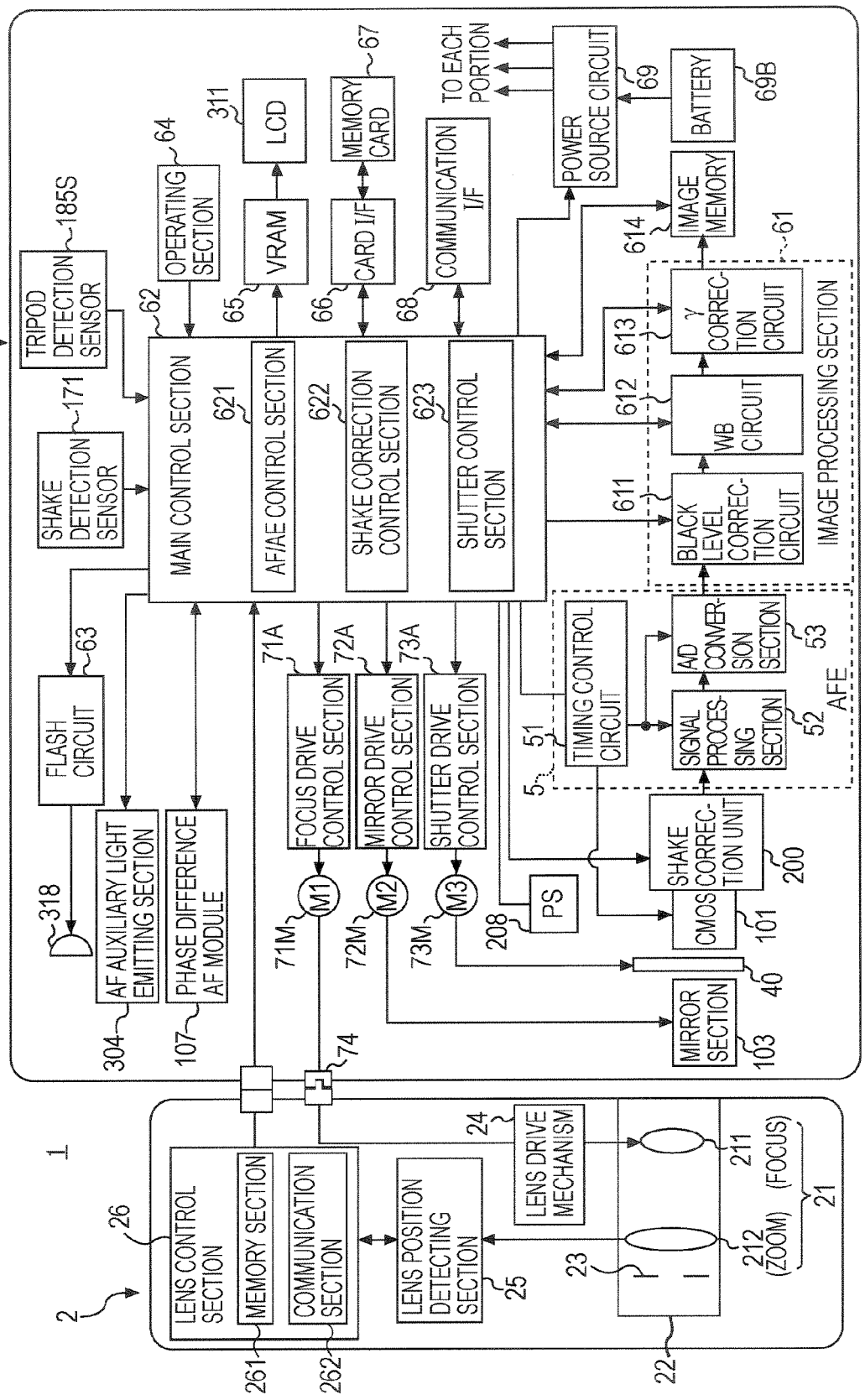
FIG. 9 is a block diagram showing the overall electrical configuration of the digital camera with a taking lens mounted on a camera body.

Next, the electrical configuration of the digital camera 1 according to this embodiment will be described. FIG. 9 is a block diagram showing the overall electrical configuration of the digital camera 1 with the taking lens 2 mounted on the camera body 10. Here, components and the like that are the same as those of FIGS. 1 to 8 are denoted by the same reference numerals. For the convenience of description, the electrical configuration of the taking lens 2 will be described first. The taking lens 2 includes, in addition to the lens group 21 and the lens barrel 22 that constitute the imaging optical system described above, a lens driving mechanism 24, a lens position detecting section 25, and a lens control section 26.

In the lens group 21, a focus lens 211 and a zoom lens 212, and a diaphragm 23 for adjusting the amount of light entering the imaging device 101 equipped to the camera body 10, are held in the optical axis L direction within the lens barrel 22. The lens group 21 takes in an optical image of a subject and forms the optical image on the imaging device 101 or the like. A change of the shooting magnification (focal length) or a focus control operation is performed by the lens group 21 being moved in the optical axis L direction (see FIG. 4) by an AF actuator 71M within the camera body 10.

The lens driving mechanism 24 is formed by, for example, a helicoid and a gear (not shown) for rotating the helicoid, or the like. The lens driving mechanism 24 is applied with a driving force from the AF actuator 71M via a coupler 74, and moves the lens group 21 integrally in a direction parallel to the optical axis L. It should be noted that the direction and amount of movement of the lens group 21 are respectively dependent on the rotational direction and rotational speed of the AF actuator 71M.

The lens position detecting section 25 includes an encode plate with a plurality of code patterns formed at a predetermined pitch in the optical axis L direction within the moving range of the lens group 21, and an encoder brush that moves integrally with the lens barrel 22 while in sliding contact with this encode plate. The lens position detection section 25 serves to detect the amount of movement at the time of focus control of the lens group 21.

The lens control section 26 is formed by a microcomputer incorporating a memory section 261 formed by a ROM for storing a control program, a flash memory or the like for storing data related to state information, or the like, for example. Further, the lens control section 26 includes a communication section 262 that performs communication with the main control section 62 of the camera body 10. The communication section 262 transmits to the main control section 62 state information data such as the focal length, exit pupil position, aperture value, focus distance, and ambient light quantity, and receives from the main control section 62 data on the drive amount of the focus lens 211, for example. At the time of shooting, data such as information on the focal length after the completion of an AF operation or aperture value are transmitted from the communication section 262 to the main control section 62. It should be noted that the state information data on the lens group 21 mentioned above, the data on the drive amount of the focus lens 211 transmitted from the main control section 62, and the like, for example, are stored in the memory section 261.

Next, the electrical configuration of the camera body 10 will be described. In addition to the imaging device (CMOS) 101 and the shake correction unit 200 for performing a shake correction drive of the imaging device 101, the shutter unit 40, and the like described above, the camera body 10 also includes an AFE (Analog Front End) 5, an image processing section 61, an image memory 614, the main control section 62 (control means), a flash circuit 63, an operating section 64, a VRAM 65, a card I/F 66, a memory card 67, a communications I/F 68, a power source circuit 69, a battery 69B, a focus drive control section 71A and the AF actuator 71M, a mirror drive control section 72A and a mirror driving actuator 72M, a shutter drive control section 73A and the shutter drive control section 73M, and a tripod detection sensor 185S.

Figure 10:
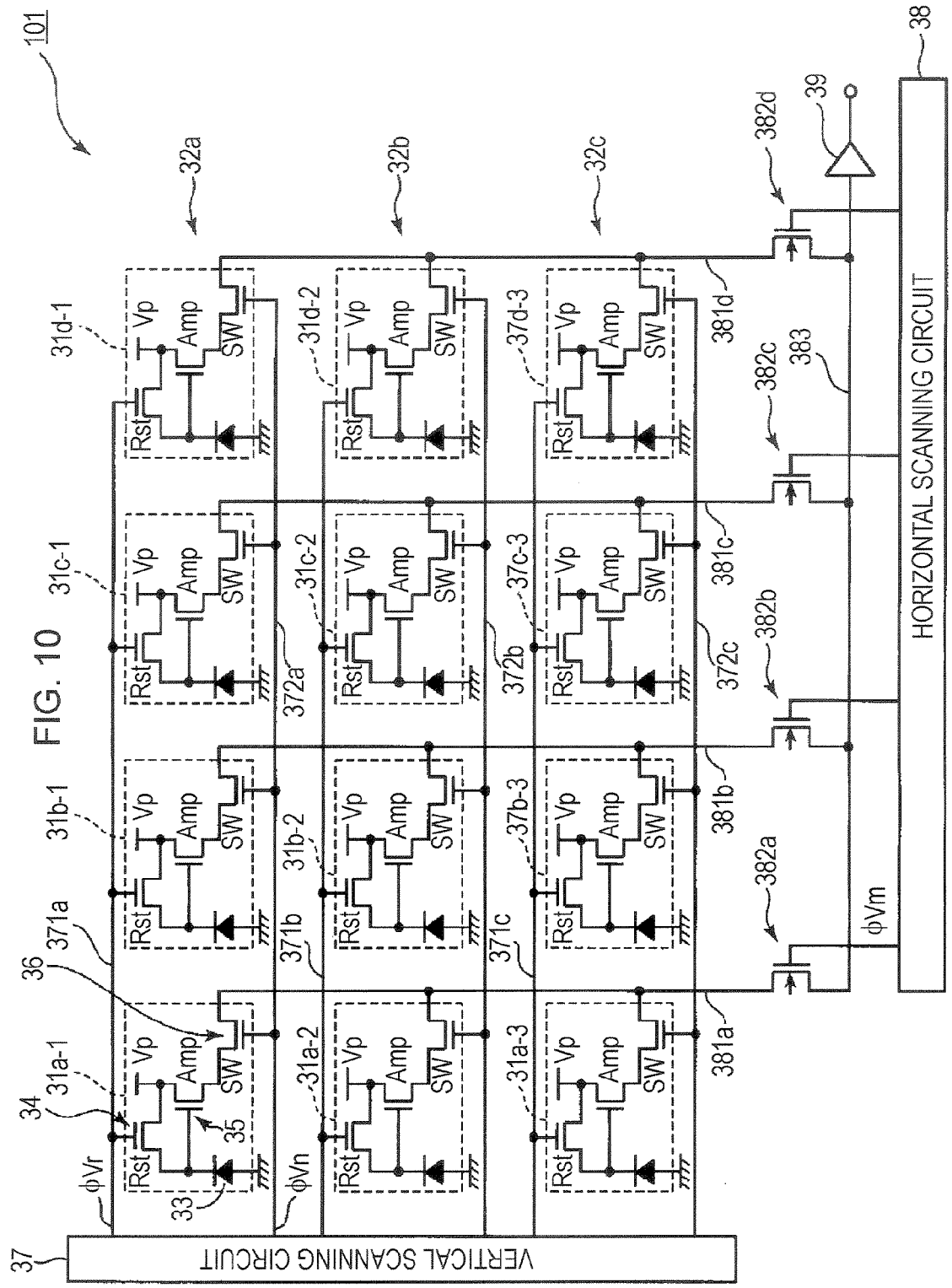
FIG. 10 is a block diagram schematically showing the circuit configuration of an imaging device.

As described above, the imaging device 101 is formed by a CMOS color area sensor. Imaging operations such as the start (and termination) of exposure of the imaging device 101, selection of the output of each pixel included in the imaging device 101, and readout of pixel signals are controlled by a timing control circuit 51 that will be described later. FIG. 10 is a circuit block diagram schematically showing the circuit configuration of the imaging device 101. Here, for the convenience of illustration, only a group of 3 lines×4 rows of pixels are shown.

The imaging device 101 includes a plurality of pixels 31 (31a-1 to 31d-3) aligned (in a matrix array) on a plurality of pixel lines 32 (32a to 32c). In the example shown in FIG. 10, pixels 31a-1, 31b-1, 31c-1, and 31d-1, pixels 31a-2, 31b-2, 31c-2, and 31d-2, and pixels 31a-3, 31b-3, 31c-3, and 31d-3 are arranged on the first pixel line 32a, the second pixel line 32b, and the third pixel line 32c, respectively. Each of the pixels 31 includes a photodiode 33 as a photoelectric conversion element for performing photoelectric conversion, a reset switch (Rst) 34 for discharging electric charge accumulated in the pixel 31 in response to a reset signal, an amplification element (Amp) 35 that reads out electric charge accumulated in the pixel 31 as a voltage (charge-voltage conversion) and amplifies this voltage, and a vertical selection switch (SW) 36 for outputting a pixel signal of the pixel 31 in response to a selection signal. It should be noted that the reset switch 34 and the amplification element 35 are connected to a power source Vp.

Further, the imaging device 101 includes a vertical scanning circuit 37, a horizontal scanning circuit 38, and an amplifier 39. For individual pixel lines 32a to 32c, the vertical scanning circuit 37 is connected with reset lines 371a to 371c to which the reset switches 34 of the respective pixels 31a-1 to 31d-3 are commonly connected, and vertical scanning lines 372a to 372c to which the control electrodes of the respective vertical selection switches 36 are commonly connected. The vertical scanning circuit 37 sequentially supplies a reset signal φVr at predetermined reset timing to each of the pixel lines 32a to 32c via the reset lines 371a to 371c, thereby causing each of the pixels 31a-1 to 31d-3 to perform a reset operation for each individual pixel lines 32a to 32c. Further, the vertical scanning circuit 37 supplies a vertical scanning pulse φVn to each of the pixels 31a-1 to 31d-3 via the vertical scanning lines 372a to 372c.

Further, for individual pixel rows (for example, the pixels 31a-1, 31a-2, and 31a-3), horizontal scanning lines 381 (381a to 381d) to which the main electrodes of the vertical selection switches 36 are commonly connected are led out for connection to a horizontal signal line 383 via horizontal switches 382 (382a to 382d). The horizontal scanning circuit 38 is connected to the control electrodes of the horizontal switches 382a to 382d described above to extract a pixel signal of a selected pixel by supplying a horizontal scanning pulse φVm. The amplifier 39 is connected to the horizontal signal line 383 to amplify an output signal from a pixel.

In the imaging device 101 configured as described above, the outputting operation (readout) of electric charge accumulated in each of the pixels 31a-1 to 31d-3 can be performed on a pixel-by-pixel basis. In addition, by controlling the operations of the vertical scanning circuit 37 and horizontal scanning circuit 38, it is possible to designate a specific pixel and output the pixel signal of that pixel. That is, the vertical scanning pulse φVn is supplied to the vertical selection switch 36 of a given pixel by the vertical scanning circuit 37, and electric charge (pixel signal) obtained by photoelectric conversion by the photodiode 33 included in that pixel becomes ready for output via the horizontal scanning line 381. Thereafter, the horizontal scanning pulse φVm is supplied by the horizontal scanning circuit 381 to the horizontal switch 382 connected to that horizontal scanning line 381, and the above-mentioned pixel signal is outputted to the horizontal signal line 383 via the horizontal switch 382. This operation is sequentially performed for each pixel, thereby making it possible to sequentially output pixel signals from all the pixels while designating pixels. A pixel signal outputted to the horizontal signal line 383 undergoes amplification by the amplifier 39 before being outputted to the AFE 5.

In the digital camera 1 according to this embodiment, there are cases where an electronic focal plane shutter is selected as the front curtain. In such cases, the timing at which the reset signal φVr is supplied to the reset switch 34 of the pixel 31 is the exposure start timing with respect to the pixel 31. That is, the reset switch 34 is turned ON by supplying the reset signal φVr to the reset switch 34, and unnecessary electric charge that has been accumulated is discharged. The reset switch 34 is then turned OFF to make the pixel 31 ready for electric charge accumulation by exposure. In the example shown in FIG. 10, since the circuit configuration is such that the reset signal φVr is supplied for each individual one of the pixel lines 32a to 32c as a unit, exposure is sequentially started for each of the first to third pixel lines 32a to 32c.

Figure 11:
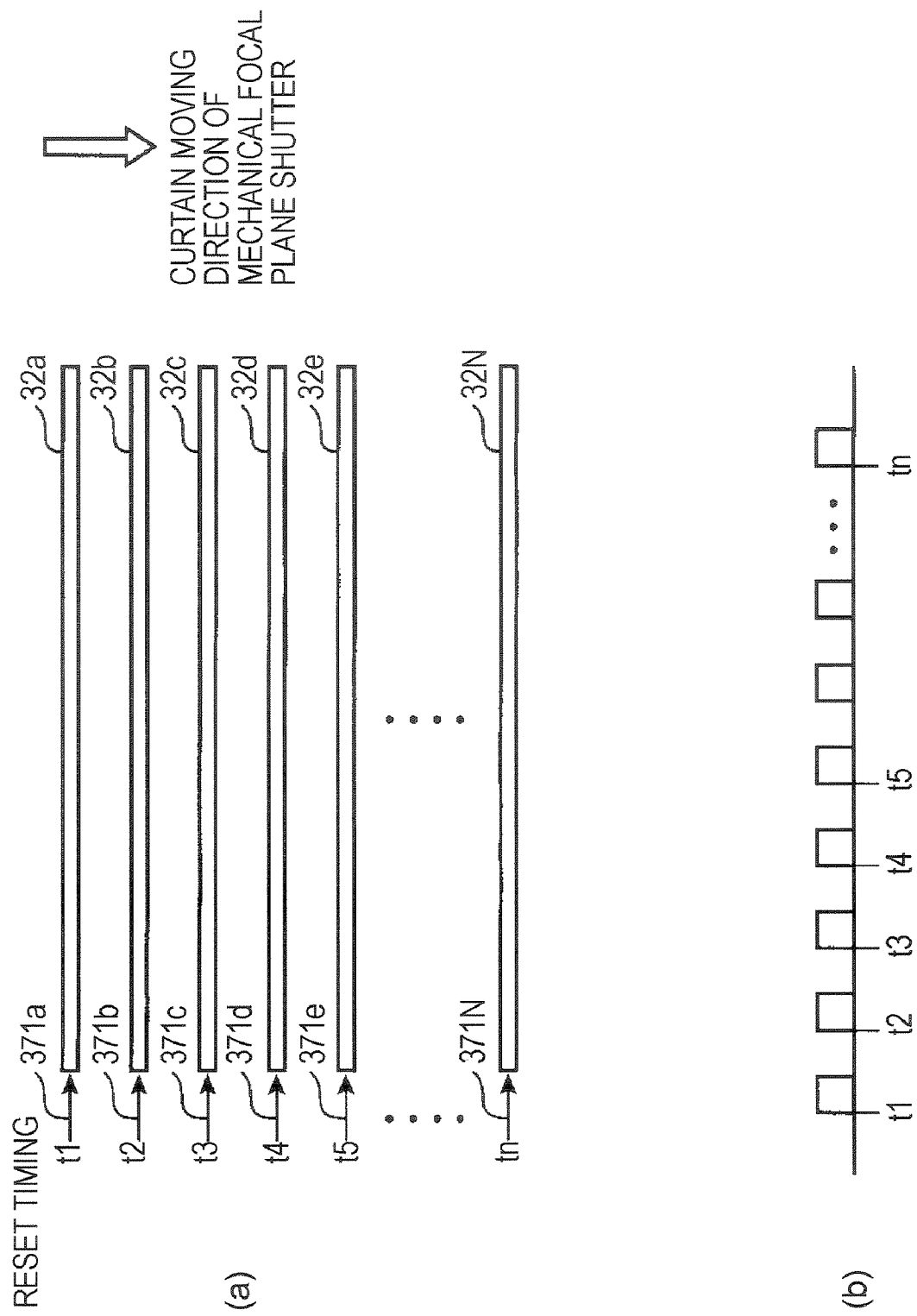
FIG. 11 is a schematic diagram illustrating an electronic focal plane shutter operation.

FIG. 11 is a schematic diagram illustrating such an electronic focal plane shutter operation. FIG. 11(a) shows the first pixel line 32a to an N-th pixel line 32N. Reset lines 371a to 371N for supplying reset signals φVr to these individual pixel lines are indicated by arrows. It should be noted that the first pixel line 32a to the N-th pixel line 32N are pixel lines in which pixels are arrayed in a direction orthogonal to the direction in which curtains included in the mechanical focal plane shutter move.

According to this configuration, the reset signals φVr as shown in FIG. 11(b) are sequentially supplied from the vertical scanning circuit 37 to the first to N-th pixel lines 32a to 32N at predetermined reset timing via the reset lines 371a to 371N. That is, first, at time t1, the reset signals φVr are simultaneously supplied to the pixels 31a-1 to 31d-1 included in the first pixel line 32a, thus starting exposure on the pixels 31a-1 to 31d-1. Next, at time t2, the reset signals φVr are simultaneously supplied to the pixels 31a-2 to 31d-2 included in the second pixel line 32b, thus starting exposure on the pixels 31a-2 to 31d-2. Subsequently, likewise, the reset signals φVr are sequentially supplied to the third pixel line 32c, the fourth pixel line 32d, the fifth pixel line 32e . . . up to the N-th pixel line 32N at respective timings t3, t4, t5, . . . tn. Exposure is thus sequentially started from the first pixel line 32a toward the N-th pixel line 32N, thus achieving the function of an electronic focal plane shutter.

In this case, the reset timing (timing at which the reset signal φVr is sequentially supplied to each of the first pixel line 32a to the N-th pixel line 32N) determines the curtain speed of this electronic focal plane shutter. That is, the curtain speed becomes faster as the period from the times t1 to tn becomes shorter. Further, the curtain speed is constant if the interval between the times t1, t2 . . . tn is constant. To control the curtain speed of an electronic focal plane shutter serving as a front curtain, the above-mentioned reset timing may be changed as appropriate.

Returning to FIG. 9, the AFE 5 supplies a timing pulse for causing a predetermined operation to be performed with respect to the imaging device 101, and also applies predetermined signal processing to an image signal outputted from the imaging device 101 (a group of analog signals received by respective pixels of the CMOS area sensor) to convert the image signal into a digital signal for output to the image processing section 61. The AFE 5 includes the timing control circuit 51, a signal processing section 52, an A/D conversion section 53, and the like.

The timing control circuit 51 (timing signal generating means) generates a predetermined timing pulse (a pulse for generating the vertical scanning pulse φVn, the horizontal scanning pulse φVm, the reset signal φVr, or the like) on the basis of a reference clock outputted from the main control section 62, and outputs the timing pulse to the imaging device 101 (the above-mentioned vertical scanning circuit 37 and horizontal scanning circuit 38 and the like), thereby controlling the imaging operation of the imaging device 101. Further, the timing control circuit 51 outputs a predetermined timing pulse to each of the signal processing section 52 and A/D conversion section 53 to thereby control the operations of the signal processing section 52 and A/D conversion section 53.

The signal processing section 52 applies predetermined analog signal processing to an analog image signal outputted from the imaging device 101. The signal processing section 52 includes a correlation double sampling (CDS) circuit, an auto gain control (AGC) circuit, a clamp circuit (clamp means), and the like. The A/D conversion section 53 converts analog image signals of R, G, and B outputted from the signal processing section 52 into digital image signals of a plurality of bits (e.g., 12 bits) on the basis of the timing pulse outputted from the timing control circuit 51.

The image processing section 61 creates an image file by performing predetermined signal processing on the image data outputted from the AFE 5, and includes a black level correction circuit 611, a white balance control circuit 612, a gamma correction circuit 613, and the like. It should be noted that the image data taken into the image processing section 61 is temporarily written into an image memory 614 in synchronism with readout from the imaging device 101. Thereafter, processing is performed in each block of the image processing section 61 by accessing the image data written in the image memory 614.

The black level correction circuit 611 converts the black level of the respective digital image signals of R, G. B that have been A/D converted by the A/D conversion section 53 into a reference black level.

The white balance control circuit 612 performs level conversion (white balance (WB) adjustment) of digital signals of respective color components of R (red), G (green), B (blue) on the basis of a white reference value that varies according to the light source. That is, on the basis of WB adjustment data supplied from the main control section 62, the white balance control circuit 612 locates a portion of a captured subject image which is assumed to be essentially white from its luminance data, saturation data, and the like, and obtains the averages of the respective color components of R, G, B at that portion, G/R ratio, and G/B ratio, and performs level correction with these as the correction gains of R and B.

The gamma correction circuit 613 corrects gradation characteristics of the image data that has undergone WB adjustment. Specifically, the gamma correction circuit 613 performs non-linear conversion on the level of image data by using a gamma correction table previously set for each color component, and performs offset adjustment.

The image memory 614 is a memory that temporarily stores image data outputted from the image processing section 61 when in the shooting mode, and is used as a work area for performing predetermined processing with respect to the image data by the main control section 62. Further, when in the playback mode, the image memory 614 temporarily stores image data read out from the memory card 67.

The main control section 62 is formed by a microcomputer with a built-in storage section, such as a ROM for storing a control program or a flash memory for temporarily storing data, for example. The main control section 62 controls the operations of the respective sections within the digital camera 1 shown in FIG. 10. The main control section 62 functionally includes an AF/AE control section 621, a shake correction control section 622, and a shutter control section 623.

The AF/AE control section 621 performs necessary operation control for auto focus control (AF) and auto exposure control (AE). That is, for AF, the AF/AE control section 621 performs focus control processing according to a phase difference detection method by using an output signal from the focus detection section (phase difference AF module) 107, generates a focus control signal (AF control signal), and operates the AF actuator 71M via the focus drive control section 71A to perform driving of the focus lens 211. For AE, on the basis of luminance information of a subject or the like detected by an AE sensor (not shown), the AF/AE control section 621 performs a computation for determining an appropriate amount of exposure (including shutter speed and the like) for that subject.

When the camera shake correction mode is executed, the shake correction control section 622 calculates a shake direction and a shake amount on the basis of a shake detection signal from the above-described shake detection sensor 171, generates on the basis of the calculated shake direction and shake amount a shake correction control signal for output to the shake correction unit 200, and shifts the imaging device 101 so as to cancel the camera shake. An example of a servo control will now be described below. That is, the shake correction control section 622 integrates an angular velocity signal detected by the shake detection sensor 171 to determine a shake amount (shake angle $\theta$) with respect to each direction, and calculates the moving distance $\delta 1$ ($\delta 1 = f \cdot \tan \theta$) of the imaging device 101 corresponding to the shake angle $\theta$ in accordance with the lens profile of the taking lens 2 such as the focal length f. Then, the shake correction control section 622 acquires position information $\delta 2$ of the imaging device 101 from the position detection sensor section 208, generates a drive signal for driving the imaging device 101 so that $\delta 1 - \delta 2 = 1$, and supplies the drive signal to the shake correction unit 200.

The shutter control section 623 controls the shutter operation in the digital camera 1, and performs control of both the mechanical focal plane shutter function and electronic focal plane shutter function. In particular, in accordance with whether or not a shake correction operation is to be actually performed, it is selectively determined whether to use, as the front curtain during exposure, an optical-path opening operation (mechanical focal plane shutter) by the front curtain group 41 of the shutter unit 40, or an electronic focal plane shutter with which exposure of the imaging device 101 is started by supplying a reset signal to each pixel of the imaging device 101 at predetermined timing. The function of the shutter control section 623 will be described later in detail with reference to FIG. 15.

The flash circuit 63 controls the flash firing amount of a flash device connected to the connecting terminal section 318 to a predetermined amount set by the main control section 62 when in the flash shooting mode.

The operating section 64 includes the above-described mode setting dial 305, the control-value setting dial 306, the shutter button 307, the setting button group 312, the camera shake correction switch 313, the cross cursor key 314, the push button 315, the main switch 317, and the like. The operating section 64 is used for inputting operation information to the main control section 62.

The VRAM 65 is a buffer memory positioned between the main control section 62 and the LCD 311 and has a recording capacity for recording image signals corresponding to the number of pixels of the LCD 311. The card I/F 66 is an interface for enabling transmission and reception of a signal between the memory card 67 and the main control section 62. The memory card 67 is a recording medium for saving image data generated by the main control section 62. The communication I/F 68 is an interface for enabling transmission of image data or the like to a personal computer or other such external device.

The power source circuit 69 is formed by, for example, a constant voltage circuit. The constant voltage circuit 69 generates a voltage (e.g. 5 V) for driving the entire digital camera 1, including the controlling sections such as the main control section 62, the imaging device 101, and other various driving sections. It should be noted that the control of power application to the imaging supply 101 is effected by a control signal supplied to the power source circuit 69 from the main control section 62. The battery 69B is formed by a primary cell such as an alkaline dry cell, or a secondary cell such as a nickel metal-hydride rechargeable battery, and is a power source for supplying electric power to the entire digital camera 1.

The focus drive control section 71A generates with respect to the AF actuator 71M a drive control signal that is required for moving the focus lens 211 to a focus position, on the basis of the AF control signal supplied from the AF/AE control section 621 of the main control section 62. The AF actuator 71M is formed by a stepping motor or the like, and imparts a lens driving force to the lens driving mechanism 24 of the taking lens 2 via the coupler 74.

The mirror drive control section 72A generates a drive signal for driving the mirror driving actuator 72M in synchronism with the timing of a shooting operation. The mirror driving actuator 72M is an actuator for causing the mirror section 103 (quick return mirror) to pivot into its horizontal position or tilted position.

The shutter drive control section 73A generates a drive control signal with respect to the shutter driving actuator 73A on the basis of a control signal supplied from the main control section 62. The shutter driving actuator 73M is an actuator for driving the shutter unit 40 (the front curtain group 41 and the rear curtain group 42 shown in FIG. 6) to open and close.

The tripod detection sensor 185S (supporting-leg detecting means) is formed by a contact sensor or the like having a contact, and is a sensor for electrically detecting whether or not a tripod (supporting leg) is attached to the tripod attaching section 185 provided to the bottom chassis of the camera body 10.

[Description of Shutter Operation]

In the digital camera 1 according to this embodiment, when a shake correction operation is actually performed by the shake correction unit 200 (when a shake correction operation should be performed), an electronic focal plane shutter is used as the front curtain, and a mechanical focal plane shutter is used as the rear curtain, thereby making it possible to start and finish exposure of the CMOS imaging device 101. The reason for performing such a shutter operation is as described below.

Figure 12:
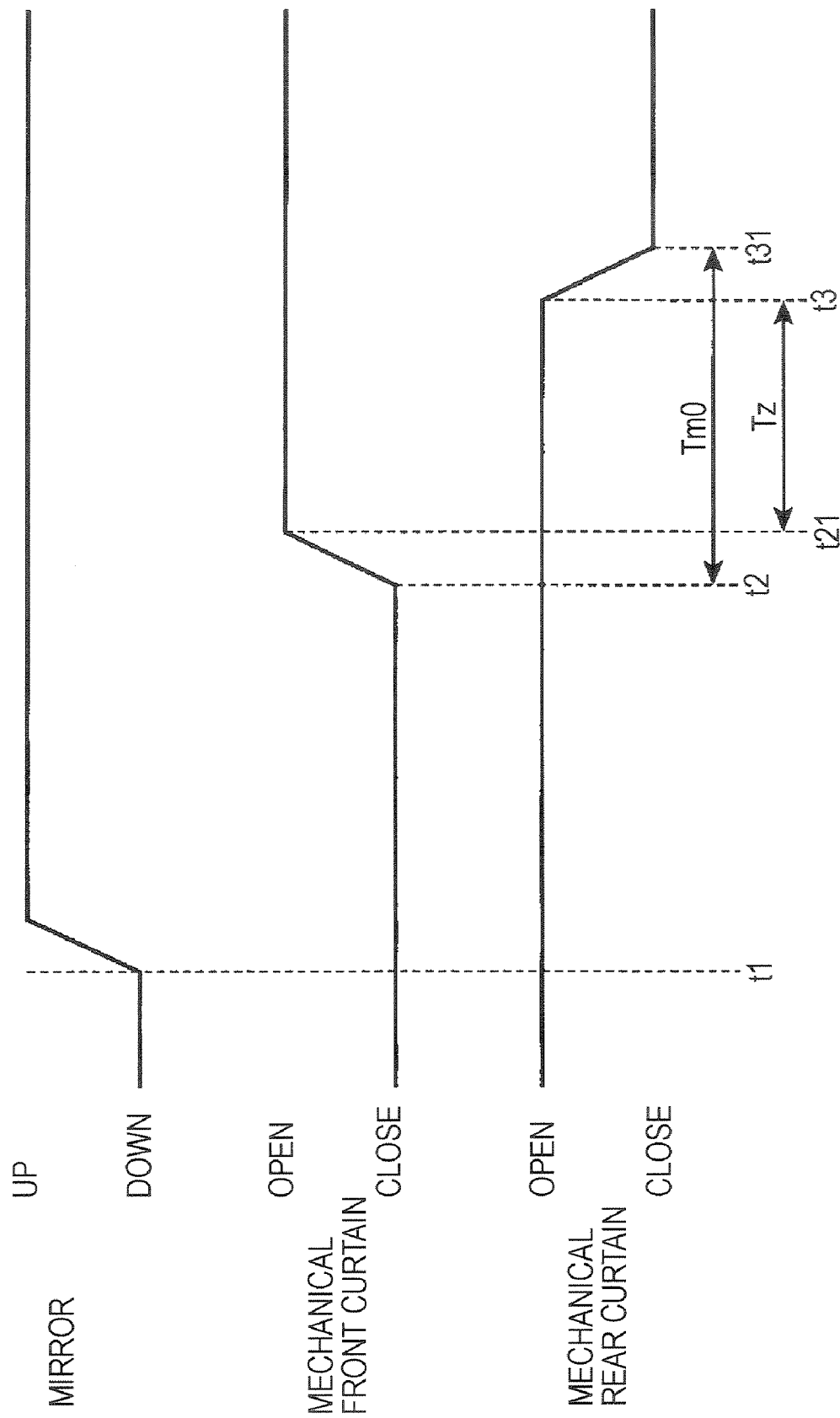
FIG. 12 is a simplified time chart illustrating the operations of a mirror section and shutter unit at exposure.

FIG. 12 is a simplified time chart showing the operations of the mirror section 103 and shutter unit 40 at exposure. Prior to performing exposure on the imaging device 101, the mirror section 103, which is in a "down" position as shown in FIG. 4 in which the mirror section 103 reflects light of a subject toward the viewfinder section 102, begins to flip up in the direction indicated by the arrow A at time t1 into an "up" position, thus securing an optical path for guiding the subject's light to the imaging device.

Next, at time t2, the travel of the front curtain group 41 (see FIG. 6) of the shutter unit 40 for opening the optical path is started (start of the transition of the split curtains 411 to 414 from the unfolded state to the overlapping state), and the travel of the front curtain group 41 is completed at time t21 (completion of the transition of the split curtains 411 to 414 to the overlapping state). Thereafter, at predetermined time t3, the travel of the rear curtain group 42 of the shutter unit 40 for blocking the optical path is started (start of the transition of the split curtains 421 to 424 from the unfolded state to the overlapping state), and the travel of the rear curtain group 42 is completed at time t31 (completion of the transition of the split curtains 421 to 424 to the overlapping state).

At this time, such operations as the aperture control and focusing control are performed during the period from the times t1 to t2. Further, in a case where the front curtain and the rear curtain in the exposure operation are each effected by a mechanical focal plane shutter, the period of time Tm0 from the time t2 at which the travel of the front curtain group 41 is started, to the time t31 at which the travel of the rear curtain group 42 is completed is the period during which exposure is actually performed (the exposure time is a period of time corresponding to the time t3-t2). It should be noted that the period of time from the time t21 at which the travel of the front curtain group 41 is completed, to the time t3 at which the travel of the rear curtain group 42 is started corresponds to shutter full-open time Tz. When a flash sync shutter speed is to be set, this is set to a shutter speed including the shutter full-open time Tx that takes the time required for the firing of a flash into account. Incidentally, when shooting at fast SS, the time at which the travel of the rear curtain group 42 is started is earlier than the above-mentioned time t21, so the shutter does not become fully open.

Figure 13:
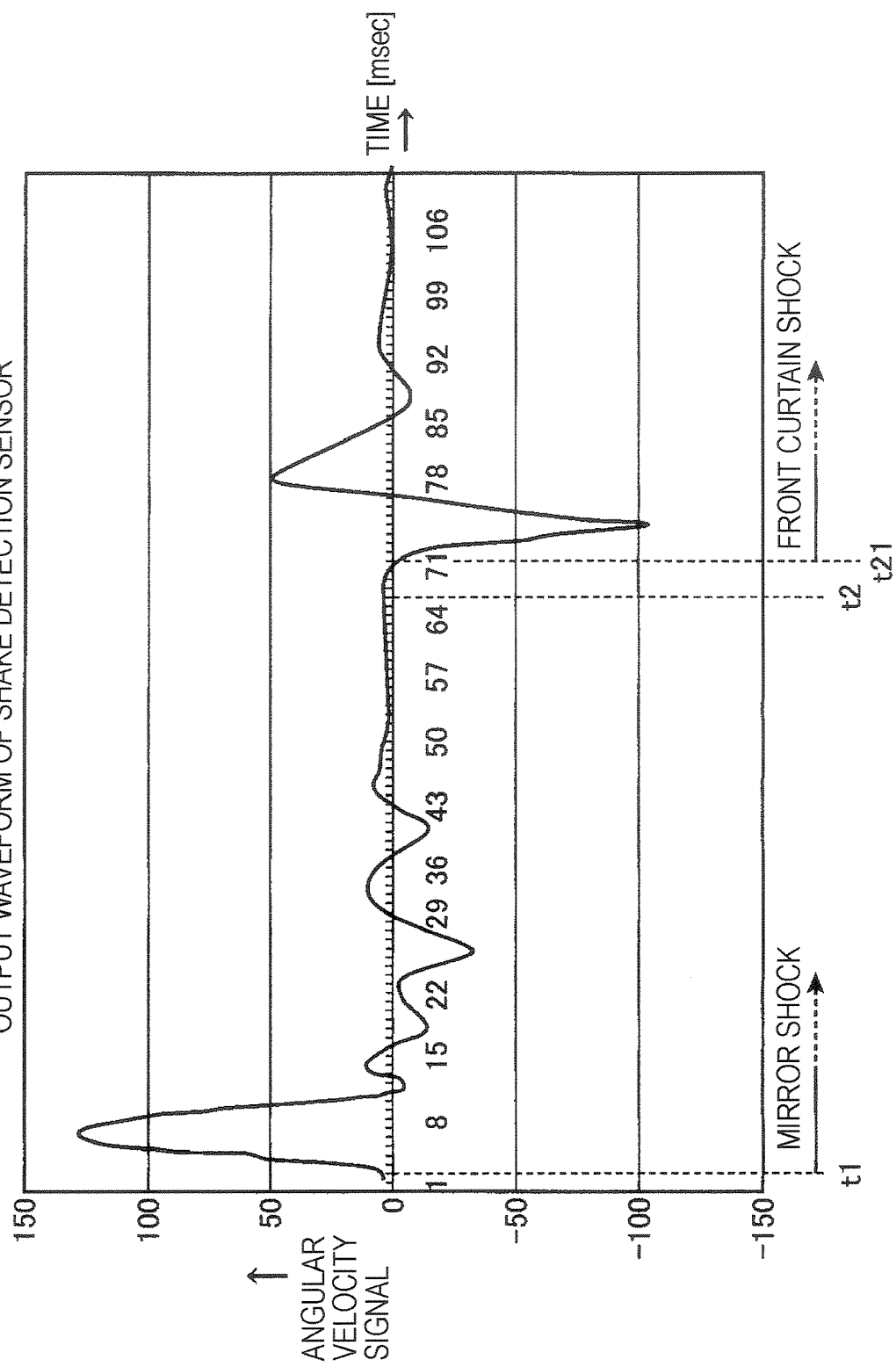
FIG. 13 is a graph showing the output waveform of a shake detection sensor, which is made to substantially coincide with the time scale of the time chart shown in FIG. 12.

As a result of the above-described mechanical operations executed within the camera body 10, mechanical vibration resulting from such mechanical operations is generated, and that vibration is detected by the shake detection sensor 171 incorporated in the camera body 10. FIG. 13 is a graph showing the output waveform of the shake detection sensor 171 which is made to substantially coincide with the time scale of the time chart shown in FIG. 12. This output waveform is obtained with the camera body 10 held in a fixed state. As indicated by the graph, after the time t1 at which the flip-up of the mirror section 103 is started, mechanical vibration (mirror shock) resulting from the flip-up motion is detected by the shake detection sensor 171, and an angular velocity signal (shake amount detection signal) corresponding to the above-mentioned mechanical vibration is outputted. Thereafter, reaction vibration is detected for a given period of time. Next, at the time t21 at which the travel of the front curtain group 41 is completed, impact vibration (front curtain shock) generated by the collision of the split curtains 411 to 414 against the shutter boards 40A, 40B or the like of the shutter unit 40 is detected by the shake detection sensor 171, and during a predetermined period of time after the time t21, an angular velocity signal corresponding to the above-mentioned impact vibration is outputted.

The above-mentioned mirror shock does not present a serious problem because it is mostly attenuated before exposure is started. However, since the front curtain shock overlaps the exposure period, if a shake correction operation is performed during this period, the front curtain shock adversely affects the shock correcting operation. That is, a shake resulting from a cause other than camera shake or the like is detected, and an erroneous shake amount detection signal is generated on the basis of such shake, which means that a shake correction drive that does not appropriately correspond to the camera shake vibration to be corrected is applied to the imaging device 101. For instance, the shake detection sensor 171 outputs the angular velocity signal as shown in FIG. 13 even in a state where there is virtually no camera shake or the like, which means that the shake correction unit 200 performs what is actually an unnecessary shake correction drive with respect to the imaging device 101. Further, in a situation where there is camera shake, the shake detection sensor 171 outputs an angular velocity signal derived from a vibration characteristic with a front curtain shock superimposed on vibration due to the camera shake, so there is a fear that it may be impossible to perform high-precision shake correction.

The above-mentioned problem of front curtain shock can be overcome by effecting the front curtain by an electronic focal plane shutter at all times. That is, the front curtain group 41 of the shutter unit 40 may be opened earlier than the exposure period, and exposure may be started by the electronic focal plane shutter after the front curtain shock has attenuated and disappeared. Alternatively, it may be also possible to adopt the shutter unit 40 that does not include the front curtain group 41. This makes it possible to avoid overlap between the front curtain shock and the exposure period.

However, when adopting a system in which an electronic focal plane shutter is used as the front curtain at all times, the front shutter is effected by the electronic focal plane shutter and the rear curtain is effected by a mechanical focal plane shutter. This brings about another problem of exposure unevenness resulting from the difference in shutter type between the front curtain and the rear curtain. Description will now be given in this regard with reference to FIG. 14.

Figure 14:
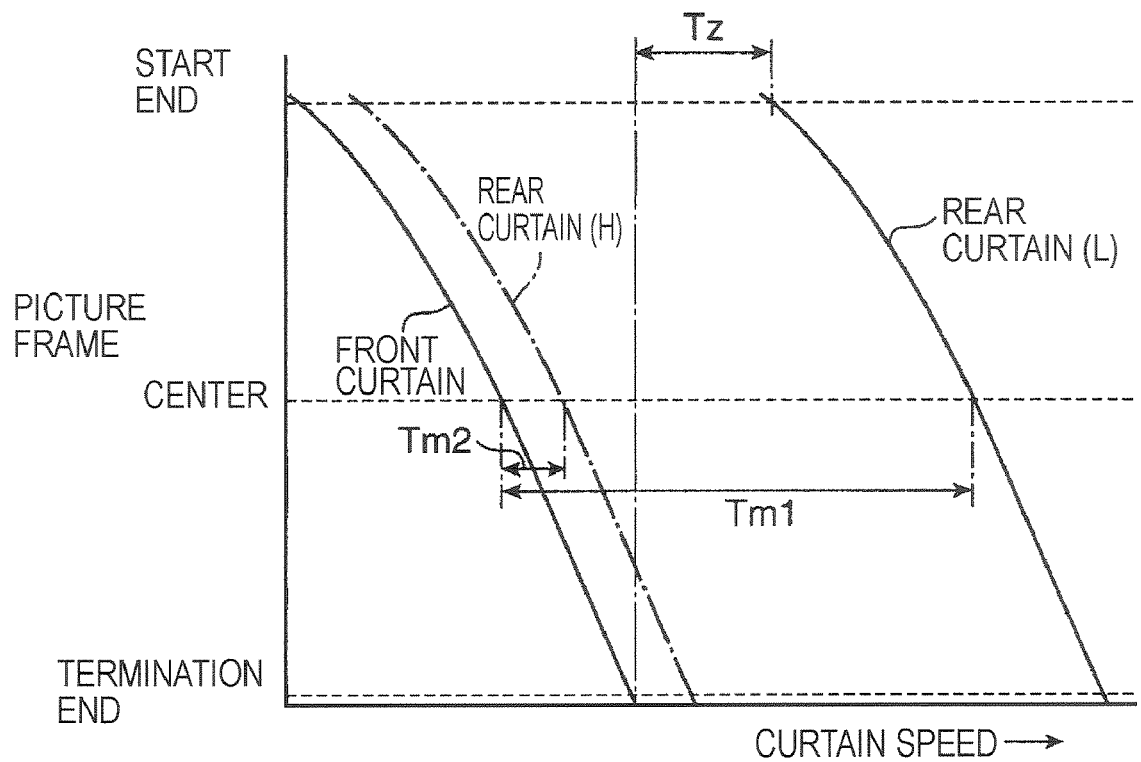
FIG. 14 is a graph showing the curtain speed characteristics in a case where a mechanical focal plane shutter is used for both a front curtain and a rear curtain.

FIG. 14 is a graph showing the curtain speed characteristics in a case where a mechanical focal plane shutter is used for both the front curtain and the rear curtain. As shown in FIG.

14, the curtain speed has a characteristic such that from the movement start end side to the termination end side of a picture frame, the curtain speed is slow at first and then gradually accelerated, becoming the fastest on the finishing end side. In addition, this curtain speed characteristic changes by such factors as the posture of the digital camera 1, temperature, and humidity, or age deterioration of the components of the shutter unit 40, and the like.

In this regard, when the shutter speed is low (slow SS), as indicated by the characteristic of the rear curtain (L) in FIG. 14, the operation of the rear curtain is started considerably later than that of the front curtain. The exposure time Tm1, including the time period Tz during which the picture frame becomes fully open, thus becomes long, so the difference in curtain speed characteristic between the front curtain and the rear curtain does not present a serious problem. In contrast, when the shutter speed is high (fast SS), as indicated by the characteristic of the rear curtain (H) in FIG. 15, the operation of the rear curtain is started while the front curtain is performing an opening operation, that is, so-called slit exposure is performed.

When such slit exposure is performed, if there is a difference in curtain speed characteristic between the front curtain and the rear curtain, the exposure period of the imaging device 101 differs among the pixel lines, causing exposure unevenness. In this regard, in a case where each of the front curtain and rear curtain is a mechanical focal plane shutter, even if the above-described age deterioration occurs, the front curtain and the rear curtain both undergo similar changes in curtain speed characteristic. Therefore, it can be said that the problem of exposure unevenness is unlikely to occur in this case. In the case of an electronic focal plane shutter, however, no such changes occur in curtain speed characteristic, which means that when the front curtain is effected by an electronic focal plane shutter and the rear curtain is effected by a mechanical focal plane shutter, a difference in curtain speed characteristic occurs, which makes exposure unevenness liable to occur.

On the other hand, during shooting at fast SS when slit exposure is performed, the influence of camera shake during the exposure period hardly appears. That is, since vibration due to camera shake is typically low-frequency vibration on the order of 1 to 10 Hz at most, there is little image blur resulting from camera shake when shooting at fast SS with a shutter speed exceeding 1/300 sec, for example. For this reason, when shooting at fast SS, there is practically no problem in performing a shooting operation with the shake correction function set OFF, even in a state where shake correction can be executed. From these reasons, it can be said that when shooting at fast SS, it is desirable to adopt a mechanical focal plane shutter for both the front curtain and the rear curtain without actuating the shake correction function (actuation of the shake correction function has little effect).

In contrast, during shooting at slow SS when the digital camera 1 is prone to the influence of camera shake, while it is necessary to perform a shooting operation with the shake correction function set ON (shake-correction execution mode), exposure unevenness due to a difference in curtain speed characteristic between the front curtain and the rear curtain does not become a problem. For these reasons, it can be said that when shooting at slow SS, it is desirable to adopt an electronic focal plane shutter for the front curtain which is not susceptible to the influence of from curtain shock (mechanical focal plane shutter for the rear curtain).

On the basis of various kinds of state information supplied to the digital camera 1 in addition to the above-mentioned shutter speed, it is determined whether or not the current state is the "shake-correction execution mode" in which it is necessary to actually perform a shake correction operation by the shake correction unit 200. When in the above-mentioned shake-correction execution mode, it is desirable to adopt an electronic focal plane shutter as the front curtain. For example, in cases such as when the camera shake correction switch 313 is turned OFF, when a tripod is attached to the tripod attaching section 185 and thus a shake correction operation is practically unnecessary, or when the amount of shake detected by the shake detection sensor 171 is a small value equal to or less than a predetermined value, it is determined that the current state is not the "shake-correction execution mode". In such a situation, it is desirable to adopt a mechanical focal plane shutter for both the front curtain and the rear curtain without actuating the shake correction function.

Figure 15:
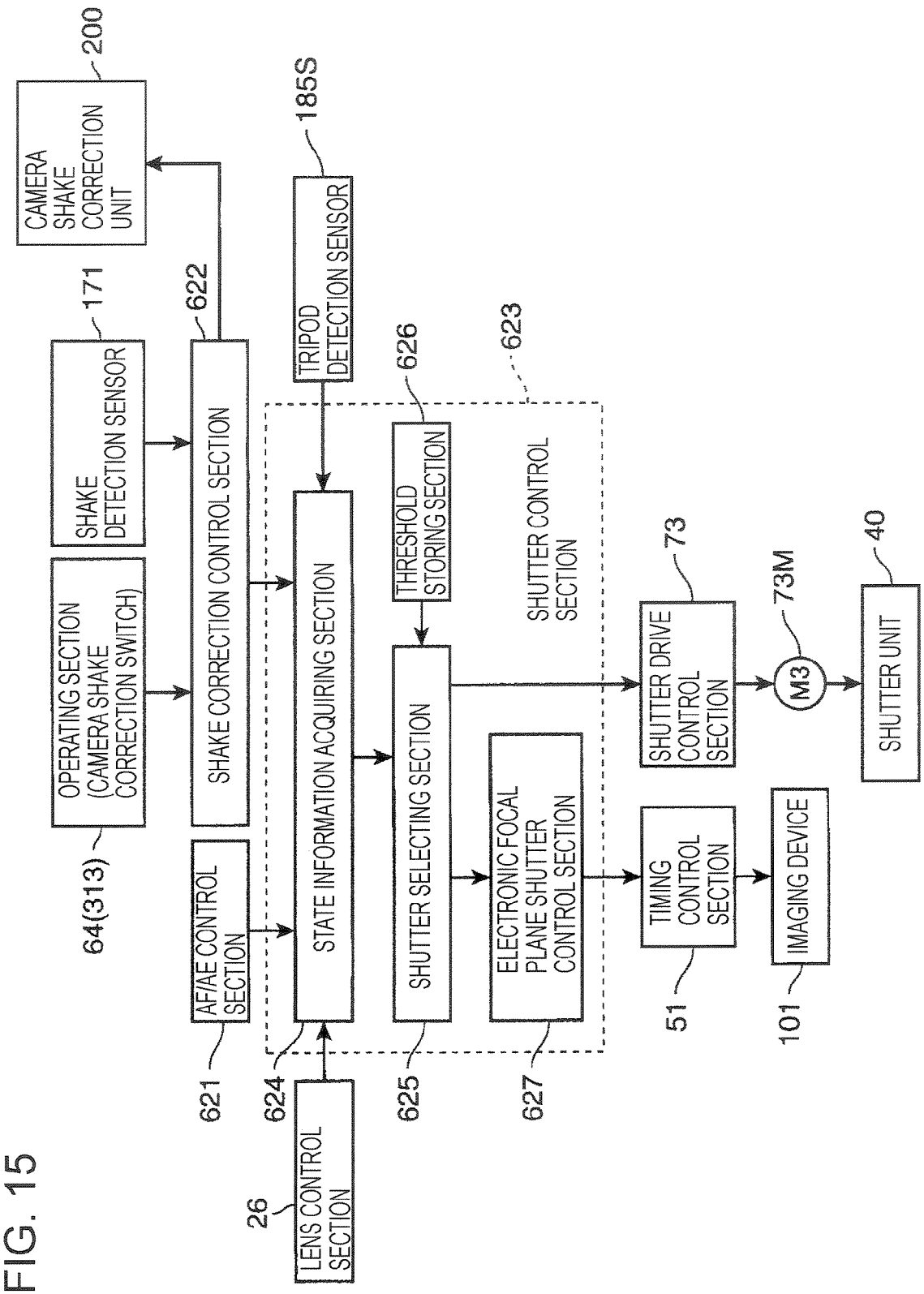
FIG. 15 is a functional block diagram showing the functional configuration of a shutter control section.

In view of the above, the digital camera 1 according to this embodiment is provided with the shutter control section 623 to perform a control for selecting either a mechanical focal plane shutter or an electronic focal plane shutter as the front curtain in accordance with whether or not the current state is the "shake-correction execution mode". FIG. 15 is a functional block diagram showing the functional configuration of the shutter control section 623. The shutter control section 623 includes a state information acquiring section 624, a shutter selecting section 625, a threshold storing section 626, and an electronic focal plane shutter control section 627.

The state information acquiring section 624 acquires various kinds of state information supplied to the digital camera 1, and offers these pieces of state information at the time of the front curtain selection/determination by the shutter selecting section 625. Specifically, the state information acquiring section 624 acquires the following pieces of state information (a) to (e).

(a) State information on whether or not an operation signal for executing a shake correction operation has been supplied from the operating section 64 (camera shake correction switch 313) (information on whether the camera shake correction switch 313 is ON or OFF).

(b) A detection signal from the tripod detection sensor 185S. This serves as state information on whether or not a tripod is attached to the tripod attaching section 185.

(c) A shake amount detection signal detected by the shake detection sensor 171. This is state information on the shake being actually applied to the digital camera 1, and serves as state information for determining whether or not a shake correction operation is practically required.

(d) Various kinds of data on the taking lens 2 acquired through communication with the lens control section 26 of the taking lens 2. For example, at the time of exchanging the taking lens 2, such pieces of data as its focal length, pupil position, aperture value, focus distance, and ambient light quantity are acquired. These pieces of data serve as state information with respect to the shutter speed.

(e) Such pieces of data as the focal length and aperture value set through the AF/AE control in the AF/AE control section 621. Such pieces of data also serve as state information with respect to the shutter speed.

It should be noted that as for the shutter speed, the shutter speed information set in the AF/AE control section itself may be acquired by the state information acquiring section 624.

On the basis of the above-mentioned pieces of state information (a) to (e), the shutter selecting section 625 makes a determination as to which one of a mechanical focal plane shutter and an electronic focal plane shutter is to be selected as the front curtain. Such a determination is made on the basis of whether or not the current state is the "shake-correction execution mode" in which a shake correction operation by the shake correction unit 200 is actually necessary. Further, when it is determined that the current state is the "shake-correction execution mode", an electronic focal plane shutter is selected as the front curtain (second exposure start control), and when it is determined that the current state is not the "shake-correction execution mode", a mechanical focal plane shutter is selected as the front curtain (first exposure start control).

For instance, the shutter selecting section 625 determines that the current state is the "shake-correction execution mode" in the following cases.

[A] When the camera shake switch 313 is ON. Although this is the simplest determination criterion, in order to reduce the influence of front curtain shock as much as possible, in actuality, rather than definitively determining that the current state is the "vibration correction execution mode" solely on the basis of this state information, it is desirable to make such a definitive determination by also referring to other pieces of state information. It should be noted that when the camera shake correction switch 313 is OFF, it is definitively determined that the current state is not the "shake-correction execution mode", and a mechanical focal plane shutter is selected as the front curtain. The cases described below represent determinations made under the assumption that the camera shake correction switch 313 is ON.

[B] When a tripod-attachment detection signal is not outputted from the tripod detection sensor 185S. This is because vibration due to camera shake or the like is likely to be applied to the digital camera 1 in this case. It should be noted that if a tripod-attachment detection signal is outputted, this means that the digital camera 1 is stably supported in place and hence there is no fear of camera shake or the like, so a mechanical focal plane shutter is selected as the front curtain.

[C] When a shake amount detection signal detected by the shake amount detection sensor 171 has a value equal to or larger than a predetermined value. In this case, the front curtain is selected in accordance with the magnitude of shake being actually applied to the digital camera 1, rather than such simple state information as whether the camera shake correction switch 313 is ON/OFF or whether or not a tripod is attached. An electronic focal plane shutter is selected as the front curtain in situations where large shake, such as one that causes the shake amount detection signal to exceed a predetermined value, is applied and thus shake correction is actually required. It cases where a shake amount equal to or larger than a predetermined value has not been detected although the digital camera 1 is in a state where shake correction can be executed, a mechanical focal plane shutter is selected as the front curtain.

[D] When the shutter speed is lower than a predetermined value. As described above, when shooting at slow SS, the influence of camera shake tends to appear conspicuously on the captured image. Accordingly, in such a case, an electronic focal plane shutter is selected as the front curtain in order to avoid the influence of front curtain shock. On the other hand, during shooting at fast SS in which the shutter speed is higher than a predetermined value, the influence of camera shake hardly appears on the captured image. It is thus regarded that the current state is not the "vibration correction execution mode", and a mechanical focal plane shutter is selected as the front curtain. This also provides the effect of suppressing exposure unevenness resulting from a difference in curtain speed between the front curtain and the rear curtain.

The shutter speed is determined in accordance with various kinds of data on the taking lens 2 being mounted, the focal length and aperture value set through the AF/AE control, and the like. The shutter selecting section 625 determines whether the current shutter speed is slow SS or fast SS by comparing the shutter speed derived on the basis of these values against a predetermined shutter speed threshold, and selects the front curtain as appropriate. The above-mentioned shutter speed threshold may be a fixed value (for example, $\frac{1}{250}$ sec, $\frac{1}{300}$ sec, or the like), or may be set with reference to, for example, the focal length of the shooting optical system of the digital camera 1 or the like.

A flash sync shutter speed (sync speed) is a shutter speed set so as to ensure that, in a case where a shooting mode accompanying firing of a flash is set, the shutter be made fully open for a period of time equal to the time required from the start to the end of flash firing plus a small time margin. When shake correction is performed in a state where a mechanical focal plane shutter is selected as the front curtain and the shutter speed is set to the sync speed, the shake correction operation is subject to the influence of front curtain shock. Description in this regard will be given below with reference to the time chart of FIG. 16.

Figure 16:
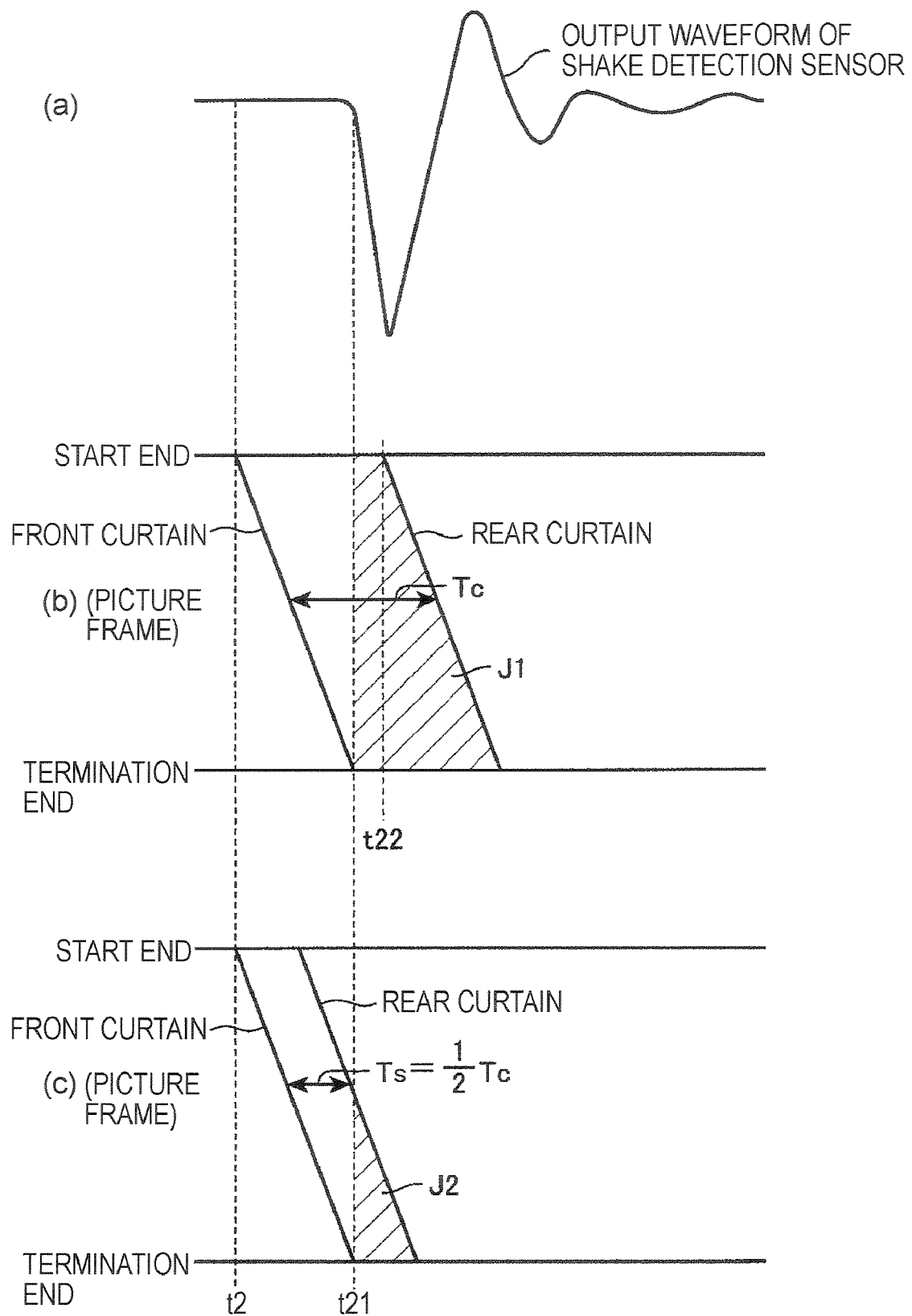
FIG. 16 is a schematic diagram illustrating the relationship between the flash sync shutter speed and the front curtain shock.

FIG. 16(*a*) shows the output waveform of the shake detection sensor 171 when the front curtain shock as described above with reference to FIG. 13 is applied. FIG. 16(*b*) shows the movements of the front curtain group 41 and rear curtain group 42 when the shutter speed is set to the sync speed (maximum speed for synchronization). The travel of the front curtain group 41 for opening the optical path is started at time t2, and the travel is completed at time t21. The shutter becomes fully open at this time t21. As described above, this full-open state is continued until time t22 at which the period of time equal to the time required for firing of a flash plus some margin ends. Then, the travel of the rear curtain group 42 is started from this time t22. Such a travel time interval between the front curtain group 41 and the rear curtain group 42, that is, Tc shown in FIG. 16(*b*) corresponds to the sync speed.

In this case, as shown in FIG. 16(*a*), a front curtain shock occurs from time t21 at which the travel of the front curtain group 41 is completed, so a shake correction operation performed at the time of exposure after time t21 is subjected to the influence of front curtain shock. That is, as the shake correction sensor 171 senses vibration due to the front curtain shock within the relatively large hatched region indicated by symbol J1 in FIG. 16(*b*), a shake correction drive is performed on the basis of an erroneous shake amount detection signal. Therefore, when the shutter speed is roughly equal to the sync speed, it is desirable to use an electronic focal plane shutter as the front curtain.

On the other hand, as shown in FIG. 16(*c*), when the shutter speed is such that the travel time interval Ts between the front curtain group 41 and the rear curtain group 42 is $\frac{1}{2}$ of the sync speed Tc (slit exposure is typically performed), the portion after time t21 subject to the influence of front curtain shock is represented by the relatively small hatched region indicated by symbol J2, so the influence of front curtain shock become small. Accordingly, with $\frac{1}{2} \cdot Tc$ taken as a threshold, a set shutter speed is determined to be slow SS if it is lower than $\frac{1}{2} \cdot Tc$, and an electronic focal plane shutter is selected as the front curtain in such a case, thus making it possible to perform a shooting operation that is not susceptible to the influence of front curtain shock. On the other hand, a set shutter speed is determined to be fast SS if it is higher than $\frac{1}{2} \cdot Tc$, and a mechanical focal plane shutter is selected as the front curtain in this case, thus making it possible to prevent exposure unevenness from occurring at the time of slit exposure.

In a case where a focal length is set as the reference, with the focal length in 135 system equivalent taken as f (mm), a shutter speed is determined to be slow SS if, for example, the set shutter speed is slower than 1/f (sec), in which case an electronic focal plane shutter can be selected as the front curtain. This is because in the 135 system with a small screen size (system having an imaging device equivalent to a 35 mm film size), generally speaking, the captured image tends to blur when shot handheld at a shutter speed lower than 1/f sec (for example, in a case where a lens with a focal length of 100 mm is mounted, if the shutter speed is slower than 1/100). If an imaging device of a size equivalent to the APS-C size, a shutter speed may be determined to be slow SS when the shutter speed is set to a speed slower than roughly 1/1.5 f (sec).

When, as a result of the above-mentioned determinations [A] to [D], the shutter selecting section 625 selects an electronic focal plane shutter as the front curtain, the shutter selecting section 625 supplies an operation command signal to the electronic focal plane shutter control section 627. In response to this, the electronic focal plane shutter control section 627 performs a control of causing the timing control circuit 51 to give a reset signal for operating the front curtain shutter to each pixel line of the imaging device 101 at predetermined reset timing. On the other hand, when the shutter selecting section 625 selects a mechanical focal plane shutter as the front curtain, the shutter selecting section 625 supplies an operation command signal to the shutter drive control section 73A, and causes the shutter unit 40 to perform a front curtain shutter operation by the shutter driving actuator 73M at the exposure start timing.

Returning to FIG. 15, the threshold storing section 626 is a functional section for storing a threshold that becomes necessary in cases when the shutter selecting section 625 makes a determination as to whether or not an amount of shake is equal to or lower than a predetermined speed or whether a shutter speed is slow SS or fast SS. The threshold storing section 626 stores, for example, a shake amount threshold for making the above-mentioned determination [C], a shutter speed threshold (shutter speed threshold with reference to sync speed or focal distance) for making the above-mentioned determination [D], and the like.

The electronic focal plane shutter control section 627 sets reset timing on a per pixel line basis in accordance with a predetermined front curtain speed via the vertical scanning circuit 37 (see FIG. 10) of the imaging device 101, and sequentially supplies the reset signal φVr to each of the pixel lines 32a to 32c at that reset timing, thereby causing the imaging device 101 to perform an electronic focal plane shutter operation as the front curtain.

According to the digital camera 1 configured as described above, since an electronic focal plane shutter is adopted as the front curtain when in the shake-correction execution mode, the shake detection sensor 171 is not susceptible to the influence of vibration due to curtain travel. Since a mechanical focal plane shutter is adopted as the front curtain when not in the shake-correction execution mode, occurrence of a difference in curtain speed between the front curtain and the rear curtain is suppressed. This prevents inappropriate shake correction from being performed on the basis of an erroneous shake amount detection signal while suppressing occurrence of exposure unevenness. Therefore, the digital camera 1 with shake correction function incorporating the CMOS imaging device 101 can acquire a clear image both during operation and non-operation of the shake correction function.

In particular, if, like the digital camera 1 according to this embodiment, the camera used is a single-lens reflex type digital camera whose taking lens 2 is interchangeable and in which the shake detection sensor 171 is mounted to the camera body 10, the shake detection sensor 171 becomes very susceptible to the influence of vibration due to curtain travel of a mechanical focal plane shutter. Therefore, by adopting an electronic focal plane shutter as the front curtain during the shake-correction execution mode, a remarkable misoperation suppressing effect can be attained also with respect to the influence of vibration due to curtain travel on the shake detection sensor 171.

(Description of Operation of Digital Camera)

Figure 17:
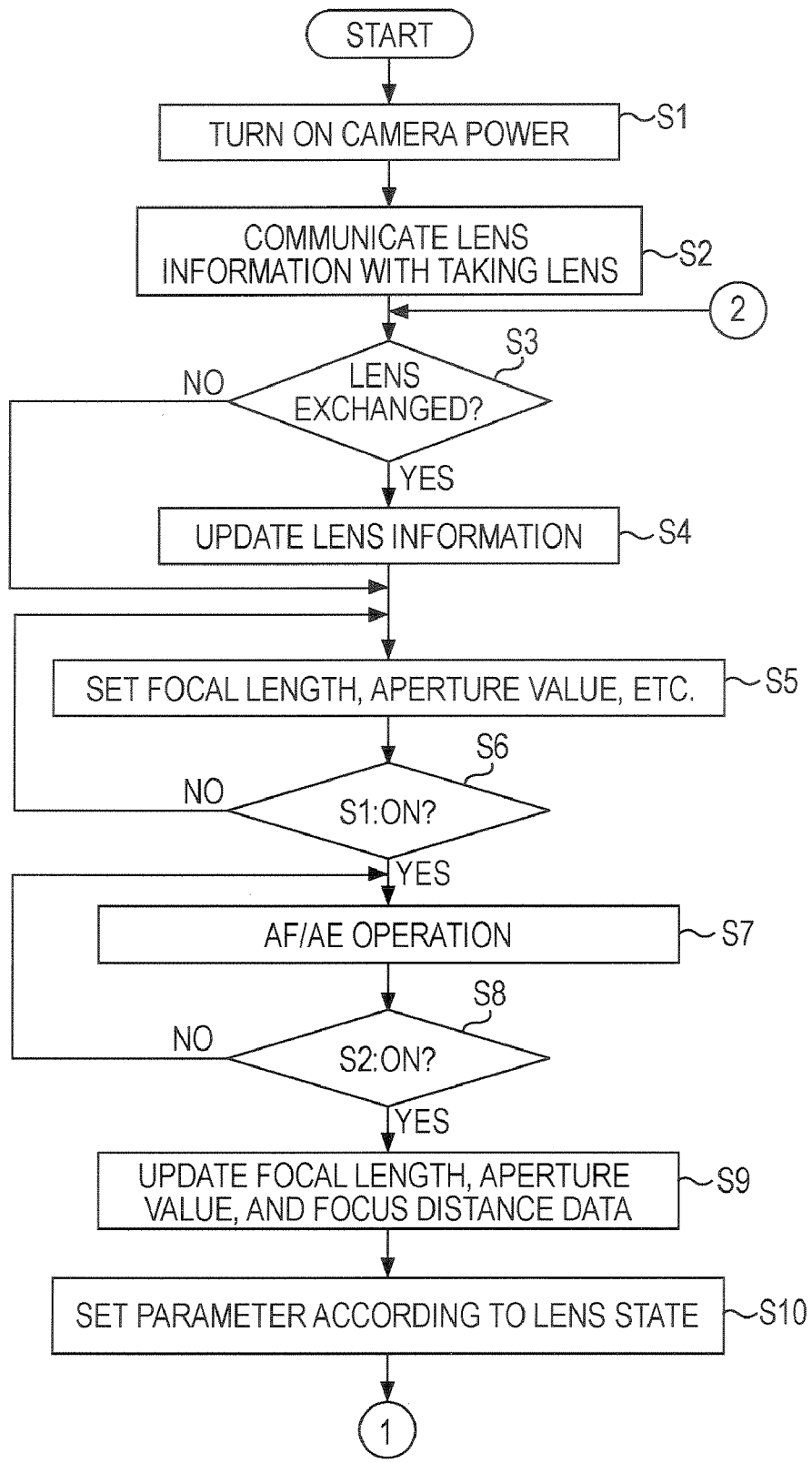
FIG. 17 is a flow chart showing imaging processing by the digital camera.
Figure 18:
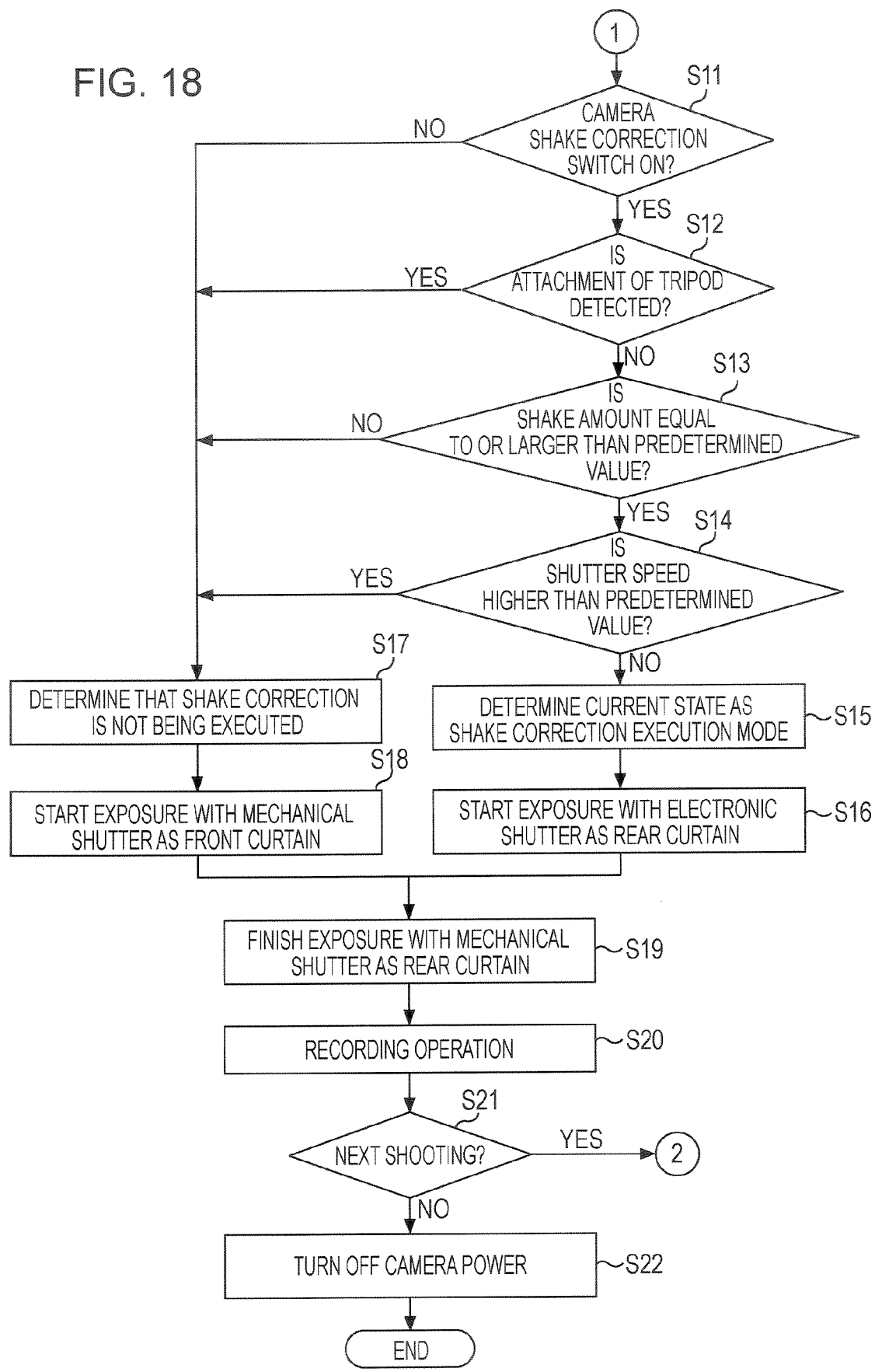
FIG. 18 is a flow chart showing imaging processing by the digital camera.

Next, a series of imaging processing by the digital camera 1 according to this embodiment will be described with reference to the drawings previously described. FIGS. 17 and 18 are flow charts showing the imaging processing by the digital camera 1. As shown in FIG. 17, when the main switch 317 (see FIG. 2) is turned ON and the power of the digital camera 1 is turned ON (step S1), the main control section 62 performs communication with the lens control section 26 of the taking lens 2 and acquires lens information on the taking lens 2 being mounted (step S2). Such lens information is stored into a RAM area included in the main control section 62.

Thereafter, it is checked by the main control section 62 whether or not the taking lens 2 has been exchanged (step S3). If the lens has been exchanged (YES in step S3), lens information is acquired by performing communication in the same manner as in step S2, and data update processing is performed with respect to the acquired lens information (step S4). If no lens exchange has been performed (NO in step S3), step S4 is skipped. Then, on the basis of the lens information acquired in step S2 or step S4, setting of a focal length, aperture value, and the like is performed (step S5). The setting at this point is not final but is a kind of a default setting in performing a shooting operation. In a case where program shooting is performed, no particular setting operation is performed.

Subsequently, the main control section 62 determines whether or not a half-press operation (S1: ON) on the shutter button 307 has been performed (step S6), and if the half-press operation has not been performed, the main control section 62 waits in standby until the half-press operation is performed (NO in step S6). When the half-press operation on the shutter button 307 is performed (YES in step S6), AE processing (determination of the shutter speed and aperture value) based on the luminance of a subject, and AF processing (determination of the focus position) according to the phase difference detection system are executed by the AF/AE control section 621 of the main control section 62 (step S7). At this time, a shake correction control by the shake correction control section is also executed. Then, it is determined whether or not a full-press operation (S2: ON) on the shutter button 307 has been performed (step S8), and if the full-press operation on the shutter button 307 has not been performed (NO in step S8), the process returns to the processing of step S7.

On the other hand, when the full-press operation on the shutter button 307 is performed (YES in step S8), the main control section 62 updates data to the focal length, aperture value, and focus length obtained after the AE processing and the AF processing (step S9). Further, the main control section 62 sets a parameter according to that lens state, and executes AE and AF (step S10). Thereafter, the process transfers to the stage of selecting the front curtain by the shutter control section 623 (shutter selecting section 625) in accordance with whether or not the current state is the "shake-correction execution mode" in which the imaging device 101 is actually subjected to a shake correction drive by the shake correction unit 200 (see FIG. 18).

The shutter selecting section 625 first determines whether or not the camera shake correction switch 313 is ON (step S11). If the camera shake correction switch 313 is OFF (NO in step S11), it is definitively determined that the current state is not the shake-correction execution mode (hereinafter, this state will be referred to as "shake correction not executed") (step S17), and a mechanical focal plane shutter (mechanical shutter) is adopted as the front curtain and exposure is started (step S18). On the other hand, if the camera shake correction switch 313 is ON (YES in step S11), the shutter selecting section 625 reserves definitive selection/determination, and determines whether or not a tripod is attached (step S12).

If a tripod-attaching detection signal has been outputted from the tripod detection sensor 185S (YES in step S12), the shutter selecting section 625 definitively determines the current state as "shake correction not executed" (step S17). On the other hand, if the tripod-attachment detection signal has not been outputted from the tripod detection sensor 185S (NO in step S12), the shutter selecting section 625 reserves definitive selection/determination, and determines whether or not a shake amount correction signal detected by the shake detection sensor 171 has a value equal to or larger than a predetermined value (step S13).

If the value of the shake amount detection value is below the predetermined value (NO in step S13), the shutter selecting section 625 definitively determines the current state as "shake correction not executed" (step S17). On the other hand, if the value of the shake amount detection signal is equal to or larger than the predetermined value (YES in step S13), the shutter selecting section 625 reserves definitive selection/determination, and determines whether or not the set shutter speed is higher than a predetermined value (step S14).

If the shutter speed is fast SS faster than the predetermined value (YES in step S14), the shutter selecting section 625 determines the current state to be "shake correction not executed" (step S17), and adopts a mechanical focal plane shutter (mechanical shutter) as the front curtain and starts exposure (S18). On the other hand, if the shutter speed is slow SS slower than the predetermined value (NO in step S14), the shutter selecting section 625 makes a final determination that the current state to be "shake-correction execution mode" (step S15), and adopts an electronic focal plane shutter as the front curtain and starts exposure (S16).

Thereafter, a mechanical focal plane shutter as the rear curtain is operated, and exposure of the imaging device is finished (step S19). Then, a series of image recording operations, including sequentially reading out pixel signals in accordance with the timing pulse supplied from the timing control circuit 51, outputting the above-mentioned pixel signals to the AFE 5 for conversion into digital signals, performing predetermined image processing on the digital signals by the image processing section 61, and recording the obtained image signals into the memory card 67, is executed (step S20). Subsequently, the main control section 62 checks whether or not the next shooting command has been supplied (step S21), and if the next shooting is to be performed (YES in step S21), the processing from step S3 to S20 is repeated. On the other hand, if the next shooting is not performed (NO in step S21), the power is automatically turned OFF after the elapse of a predetermined time period (step S22), thus ending the processing.

Although an embodiment of the present invention has been described above, additions and alterations to individual configurations can be made without departing from the scope of the present invention. For example, the following modified embodiments may be employed.

(1) In the above-mentioned embodiment, description is directed to the case where the determinations with respect to the four criteria (ON/OFF of the camera shake correction switch, whether or not a tripod has been attached, the shake amount, and the shutter speed) in steps S11 to S14 are sequentially made by the shutter selecting section 625. However, one of or a combination of two or three of these criteria may serve as the determination criteria. For example, two determination criteria, such as the ON/OFF of the camera shake correction switch and the shutter speed, may be employed.

(2) If it is determined by the shutter selecting section 625 that the current state is "shake correction not executed", it is desirable from the viewpoint of reducing power consumption that the shake correction drive by the shake correction unit 200 be set OFF even when the camera shake correction switch 313 is ON. It should be noted, however, that in the case of shooting at fast SS, for example, the operation of the shake correction unit 200 have little effect on the captured image, so the shake correction drive may not necessarily be set OFF.

(3) While in the above-mentioned embodiment description is directed to the case where a structure to be driven for shake correction is the imaging device 101, the above-mentioned structure may be a shake correction lens, a lens barrel, or the like.

(4) While in the above-mentioned embodiment the digital camera 1 is described as an example of the imaging apparatus according to the present invention, the present invention is also applicable to a digital video camera using a CMOS image sensor, a sensing apparatus including an imaging section, or the like.

The invention claimed is:

1. An imaging apparatus which includes an imaging device having a plurality of pixels arrayed in a matrix, comprising:
    shake detection means for detecting an amount of shake applied to the imaging device;
    shake correction means for performing a shake correction drive of a predetermined structure on the basis of a shake amount detection signal from the shake detection means;
    a mechanical focal plane shutter including a curtain that moves in a direction substantially orthogonal to a predetermined pixel line of the imaging device, the mechanical focal plane shutter being configured to perform an optical-path opening operation and an optical-path blocking operation for opening and blocking an optical path of light guided to the imaging device;
    timing signal generating means for supplying a predetermined reset signal to each of the pixels on the pixel line basis so as to start exposure on the imaging device; and
    control means for controlling exposure of the imaging device,
    wherein the control means is capable of executing a first exposure start control for starting exposure on the imaging device by the optical-path opening operation by the mechanical focal plane shutter, and a second exposure start control for starting exposure on the imaging device by the reset signal supplied to each of the pixels from the timing signal generating means, the second exposure start control being selected in a shake-correction execution mode during which a shake correction operation by the shake correction means is actually performed.

2. The imaging apparatus according to claim 1, further comprising operating means for allowing setting of whether or not to execute a shake correction operation by the shake correction means,
    wherein the control means determines that the current state is the shake-correction execution mode and selects the second exposure start control when an operation signal for executing a shake correction operation by the shake correction means is supplied from the operating means.

3. The imaging apparatus according to claim 1, wherein the control means determines that the current state is the shake-correction execution mode and selects the second exposure start control when a shake amount detection signal detected by the shake detection means is equal to or larger than a predetermined value.

4. The imaging apparatus according to claim 1, further comprising supporting-leg detecting means for detecting whether or not a supporting leg is attached to the imaging apparatus directly or indirectly on the basis of another parameter, wherein the control means selects the first exposure start control when attachment of the supporting leg to the imaging apparatus is detected by the supporting-leg detecting means.

5. The imaging apparatus according to claim 2, further comprising supporting-leg detecting means for detecting whether or not a supporting leg is attached to the imaging apparatus directly or indirectly on the basis of another parameter, wherein the control means selects the first exposure start control when attachment of the supporting leg to the imaging apparatus is detected by the supporting-leg detecting means.

6. The imaging apparatus according to claim 3, further comprising supporting-leg detecting means for detecting whether or not a supporting leg is attached to the imaging apparatus directly or indirectly on the basis of another parameter, wherein the control means selects the first exposure start control when attachment of the supporting leg to the imaging apparatus is detected by the supporting-leg detecting means.

7. The imaging apparatus according to claim 2, further comprising exposure control means for setting at least a shutter speed, wherein the control means determines that the current state is the shake-correction execution mode and selects the second exposure start control, when an operation signal for executing a shake correction operation by the shake correction means is supplied from the operating means, and a shutter speed set by the exposure control means is lower than a predetermined value.

8. The imaging apparatus according to claim 7, wherein the control means determines that a shutter speed is lower than a predetermined value when the shutter speed is set longer than ½ of a flash sync shutter speed in the mechanical focal plane shutter.

9. The imaging apparatus according to claim 7, wherein assuming that a focal length in 135 system equivalent of a shooting optical system included in the imaging apparatus is f (mm), the control means determines that a shutter speed is lower than a predetermined value when the shutter speed is set longer than 1/f (sec).

10. The imaging apparatus according to claim 2, wherein:
the imaging apparatus is configured so that a taking lens is interchangeable with respect to an imaging apparatus body portion; and
the shake detection means is included in the imaging apparatus body portion.

11. The imaging apparatus according to claim 1, wherein the structure subjected to a shake correction drive by the shake correction means is the imaging device.

12. The imaging apparatus according to claim 2, wherein the structure subjected to a shake correction drive by the shake correction means is the imaging device.

13. The imaging apparatus according to claim 3, wherein the structure subjected to a shake correction drive by the shake correction means is the imaging device.

14. The imaging apparatus according to claim 4, wherein the structure subjected to a shake correction drive by the shake correction means is the imaging device.

15. The imaging apparatus according to claim 5, wherein the structure subjected to a shake correction drive by the shake correction means is the imaging device.

16. The imaging apparatus according to claim 6, wherein the structure subjected to a shake correction drive by the shake correction means is the imaging device.

17. The imaging apparatus according to claim 7, wherein the structure subjected to a shake correction drive by the shake correction means is the imaging device.

18. The imaging apparatus according to claim 8, wherein the structure subjected to a shake correction drive by the shake correction means is the imaging device.

19. The imaging apparatus according to claim 9, wherein the structure subjected to a shake correction drive by the shake correction means is the imaging device.

20. The imaging apparatus according to claim 10, wherein the structure subjected to a shake correction drive by the shake correction means is the imaging device.

21. The imaging apparatus according to claim 1, wherein the imaging device is a CMOS imaging device.

* * * * *